United States Patent
Wang et al.

(10) Patent No.: US 12,282,867 B2
(45) Date of Patent: Apr. 22, 2025

(54) PRIVACY PRESERVING MACHINE LEARNING USING SECURE MULTI-PARTY COMPUTATION

(71) Applicant: Google LLC, Mountain View, CA (US)

(72) Inventors: Gang Wang, Frederick, MD (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 96 days.

(21) Appl. No.: 17/927,923

(22) PCT Filed: Sep. 29, 2021

(86) PCT No.: PCT/US2021/052540
§ 371 (c)(1),
(2) Date: Nov. 28, 2022

(87) PCT Pub. No.: WO2022/072415
PCT Pub. Date: Apr. 7, 2022

(65) Prior Publication Data
US 2023/0214684 A1 Jul. 6, 2023

(30) Foreign Application Priority Data
Oct. 2, 2020 (IL) .......................... 277761

(51) Int. Cl.
G06N 5/04 (2023.01)
G06F 18/2413 (2023.01)
G06F 21/60 (2013.01)

(52) U.S. Cl.
CPC ......... *G06N 5/04* (2013.01); *G06F 18/24147* (2023.01); *G06F 21/602* (2013.01)

(58) Field of Classification Search
None
See application file for complete search history.

(56) References Cited

U.S. PATENT DOCUMENTS

2016/0283738 A1\* 9/2016 Wang ................. G06N 20/00
2019/0073608 A1 3/2019 Veeningen
(Continued)

FOREIGN PATENT DOCUMENTS

JP 2017-207839 11/2017

OTHER PUBLICATIONS

International Preliminary Report on Patentability in International Appln. No. PCT/US2021/054183, mailed on Mar. 28, 2023, 13 pages.

(Continued)

*Primary Examiner* — Syed A Roni
(74) *Attorney, Agent, or Firm* — Fish & Richardson P.C.

(57) ABSTRACT

This disclosure relates to a privacy preserving machine learning platform. In one aspect, a method includes receiving, by a first computing system of multiple multi-party computation (MPC) systems, an inference request that includes a first share of a given user profile. A number k of nearest neighbor user profiles that are considered most similar to the given user profile are identified. The first computing system identifies a first set of nearest neighbor profiles based on the first share of the given user profile and a k-nearest neighbor model. The first computing system receives, from each of one or more second computing systems of the multiple MPC systems, data indicating a respective second set of nearest neighbor profiles identified by the second computing system based on a respective second share of the given user profile and a respective second k-nearest neighbor model trained by the second computing system.

20 Claims, 6 Drawing Sheets

(56) References Cited

U.S. PATENT DOCUMENTS

2020/0242466 A1 7/2020 Mohassel et al.
2021/0209247 A1* 7/2021 Mohassel ............. A63B 21/023

OTHER PUBLICATIONS

Office Action in Israel Appln. No. 277910, dated Apr. 20, 2023, 4 pages.
Kanagavelu et al., "Two-Phase Multi-Party Computation Enabled Privacy-Preserving Federated Learning" Submitted on May 2020, arXiv:2005.11901v1, 11 pages.
Notice of Allowance in Japanese Appln. No. 2022-537713, mailed on Sep. 4, 2023, 5 pages (with English translation).
Achlioptas, "Database-friendly Random Projections: Johnson-Lindenstrauss with Binary Coins." Journal of Computer and System Sciences 66.4, Jun. 2003, 671-687.
Boneh et al., "Key Homomorphic PRFs and Their Applications." Feb. 2, 2014, 41 pages.
Charlie Harrison, "Aggregated Reporting API" submitted on Sep. 17, 2020, <https://github.com/csharrison/aggregate-reporting-api>, 6 pages.
Chen et al., "When Homomorphic Encryption Marries Secret Sharing: Secure Large-Scale Sparse Logistics Regression and Applications in Risk Control" submitted on Aug. 20, 2020, arXiv preprint arXiv:2008.08753v1, 9 pages.
Dritsas et al., "Trajectory Clustering and k-NN for Robust Privacy Preserving k-NN Query Processing in GeoSpark" Algorithms, vol. 13, No. 8, 182, Jul. 28, 2020, 1-23.
International Search Report and Written Opinion in International Appln. No. PCT/US2021/052540, dated Dec. 22, 2021, 18 pages.
International Search Report and Written Opinion in International Appln. No. PCT/US2021/054183, dated Mar. 1, 2022, 20 pages.
Josh Karlin, "FloC" Submitted on Aug. 22, 2019, <https://github.com/WICG/floc>, 7 pages.
Kenthapadi et al., "Privacy via the Johnson-Lindenstrauss Transform." submitted on Apr. 12, 2012, arXiv preprint arXiv:1204.2606, 24 pages.
Li et al., "Privacy-preserving Distributed Profile Matching in Proximity-based Mobile Social Networks." IEEE Transactions on Wireless Communications 12.5, May 2013, 2024-2033.
Liu et al., "Towards an Efficient Privacy-Preserving Decision Tree Evaluation Service in the Internet of Things," Symmetry, vol. 12, No. 1, Jan. 6, 2020, 16 pages.
Michael Kleber "Turtle Dove" submitted on Jan. 16, 2020, <https://github.com/WICG/turtledove>, 2 pages.
Nishide et al., "Multiparty Computation for Interval, Equality, and Comparison without Bit-Decomposition Protocol." 2007, 1-19.
Oh et al., "Representations of Binary Forms by Quinary Quadratic Forms" (PDF). Trends in Mathematics. 3 (1), Dec. 2000, 102-107.
Park et al., "Privacy Preserving k-nearest neighbor for Medical Diagnosis in e-health Cloud." Journal of Healthcare Engineering 2018, Oct. 2018, 1-11.
Rabin et al., "Randomized algorithms in number theory." Communications on Pure and Applied Mathematics 39.S1, 1986, S239-S256.
Schoppmann et al., "Private Nearest Neighbors Classification in Federated Databases." IACR Cryptol. ePrint Arch. 2018, Mar. 2018, 289, 1-16.
Shamir, "How to Share a Secret." Communications of the ACM 22.11, Nov. 1979, 612-613.
Wikipedia.org [online], "Gradient boosting" Jul. 31, 2020, retrieved on Aug. 6, 2020, retrieved from URL <https://en.wikipedia.org/w/index.php?title=Gradient_boosting&oldid=970532653>, 8 pages.
Wikipedia.org [online], "Arithmetic mean" Jun. 17, 2020, retrieved on Jun. 22, 2020, retrieved from URL <https://en.wikipedia.org/w/index.php?title=Arithmetic_mean&oldid=963009870>, 5 pages.
Wikipedia.org [online], "Binary classification" May 14, 2020, retrieved on May 28, 2020, retrieved from URL <https://en.wikipedia.org/w/index.php?title=Binary_classification&oldid=956715600>, 5 pages.
Wikipedia.org [online], "Boosting (machine learning)" Jul. 23, 2020, retrieved on Aug. 6, 2020, retrieved from URL <https://en.wikipedia.org/w/index.php?title=Boosting_(machine_learning)&oldid=969062071>, 7 pages.
Wikipedia.org [online], "Categorical variable" May 14, 2020, retrieved on Jun. 22, 2020, retrieved from URL <https://en.wikipedia.org/w/index.php?title=Categorical_variable&oldid=956577704>, 8 pages.
Wikipedia.org [online], "Deep Learning" Aug. 2, 2020, retrieved on Aug. 6, 2020, retrieved from URL <https://en.wikipedia.org/w/index.php?title=Deep_learning&oldid=970745362>, 34 pages.
Wikipedia.org [online], "Federated learning" Jun. 14, 2020, retrieved on Jun. 22, 2020, retrieved from URL <https://en.wikipedia.org/w/index.php?title=Federated_learning&oldid-962506076>, 8 pages.
Wikipedia.org [online], "Geometric mean" Jun. 6, 2020, retrieved on Jun. 22, 2020, retrieved from URL <https://en.wikipedia.org/w/index.php?title-Geometric_mean&oldid=961077179>, 11 pages.
Wikipedia.org [online], "Johnson-Lindenstrauss lemma" Jul. 30, 2020, retrieved on Aug. 6, 2020, retrieved from URL <https://en.wikipedia.org/w/index.php?title=Johnson%E2%80%93Lindenstrauss_lemma&oldid=970488823>, 5 pages.
Wikipedia.org [online], "Kernel (statistics)"Jun. 17, 2020, retrieved on Aug. 6, 2020, retrieved from URL <https://en.wikipedia.org/w/index.php?title=Kernel_(statistics)&oldid=963115754>, 5 pages.
Wikipedia.org [online], "K-nearest neighbors algorithm" Jul. 19, 2020, retrieved on Aug. 6, 2020, retrieved from URL <https://en.wikipedia.org/w/index.php?title=K-nearest_neighbors_algorithm&oldid=968399216>, 11 pages.
Wikipedia.org [online], "Known-plaintext attack", Mar. 21, 2020, retrieved on Aug. 6, 2020, retrieved from URL <https://en.wikipedia.org/w/index.php?title=Known-plaintext_attack&oldid=946678781>, 3 pages.
Wikipedia.org [online], "Locality-Sensitive Hashing" Jun. 21, 2020, retrieved on Jun. 22, 2020, retrieved from URL <https://en.wikipedia.org/w/index.php?title=Locality-sensitive_hashing&oldid-963662995>, 9 pages.
Wikipedia.org [online], "Multiclass classification" May 15, 2020, retrieved on Jun. 22, 2020, retrieved from URL <https://en.wikipedia.org/w/index.php?title=Multiclass_classification&oldid=956752346>, 5 pages.
Wikipedia.org [online], "Normal distribution" Jun. 7, 2020, retrieved on Jun. 22, 2020, retrieved from URL <https://en.wikipedia.org/w/index.php?title=Normal_distribution&oldid-961232831>, 37 pages.
Wikipedia.org [online], "Pseudorandom function family" Nov. 27, 2019, retrieved on Jun. 22, 2020, retrieved from URL <https://en.wikipedia.org/w/index.php?title=Pseudorandom_function_family&oldid=928163524>, 3 pages.
Wikipedia.org [online], "Secret Sharing" Aug. 3, 2020, retrieved on Aug. 6, 2020, retrieved from URL <https://en.wikipedia.org/w/index.php?title=Secret_sharing&oldid=970942801>, 8 pages.
Wikipedia.org [online], "Secure multi-party computation" May 2, 2020, retrieved on Jun. 22, 2020, retrieved from URL <https://en.wikipedia.org/w/index.php?title=Secure_multi-party_computation&oldid=954365012>, 12 pages.
Office Action in Israel Appln. No. 277761, dated Feb. 28, 2023, 3 pages.
Office Action in Indian Appln. No. 202227029193, mailed on Oct. 31, 2023, 9 pages (with English translation).
Office Action in Indian Appln. No. 202327025041, mailed on Apr. 30, 2024, 10 pages (with English translation).

* cited by examiner

PRIVACY PRESERVING MACHINE LEARNING USING SECURE MULTI-PARTY COMPUTATION

CROSS-REFERENCE TO RELATED APPLICATION

This application is a National Stage Application under 35 U.S.C. § 371 and claims the benefit of International Application No. PCT/US2021/052540, filed Sep. 29, 2021, which claims priority to IL Application No. 277761, filed Oct. 2, 2020. The disclosure of the foregoing applications are hereby incorporated by reference in their entirety.

TECHNICAL FIELD

This specification relates to a privacy preserving machine learning platform that trains and uses machine learning models using secure multi-party computation.

BACKGROUND

Some machine learning models are trained based on data collected from multiple sources, e.g., across multiple websites and/or native applications. However, this data may include private or sensitive data that should not be shared or allowed to leak to other parties.

SUMMARY

In general, one innovative aspect of the subject matter described in this specification can be embodied in methods that include receiving, by a first computing system of multiple multi-party computation (MPC) systems, an inference request comprising a first share of a given user profile; identifying a number k of nearest neighbor user profiles that are considered most similar to the given user profile among multiple user profiles, including: identifying, by the first computing system and based on the first share of the given user profile and a first k-nearest neighbor model trained using the multiple user profiles, a first set of nearest neighbor user profiles; receiving, by the first computing system and from each of one or more second computing systems of the multiple MPC systems, data indicating a respective second set of nearest neighbor profiles identified by the second computing system based on a respective second share of the given user profile and a respective second k-nearest neighbor model trained by the second computing system; identifying, by the first computing system and based on the first set of nearest neighbor user profiles and each second set of nearest neighbor user profiles, the number k of nearest neighbor user profiles; generating, by the first computing system, a first share of an inference result based on a respective label for each of the k nearest neighbor user profiles, wherein the label for each user profile is predictive of one or more user groups to which a user corresponding to the user profile will be added, and wherein the inference result indicates whether a given user corresponding to the given user profile is to be added to a given user group; and providing, by the first computing system and to a client device, the first share of the inference result and a respective second share of the inference result received from each of the one or more second computing systems. Other implementations of this aspect include corresponding apparatus, systems, and computer programs, configured to perform the aspects of the methods, encoded on computer storage devices.

These and other implementations can each optionally include one or more of the following features. In some aspects, the inference request includes an encrypted second share of the given user profile that was encrypted using an encryption key of the second computing system. Some aspects can include transmitting the encrypted second share of the given user profile to the second computing system.

In some aspects, the second share of the inference result is encrypted using an encryption key of an application of the client device. In some aspects, the label for each user profile has a Boolean type for binary classification. Generating the first share of the inference result can include determining a first share of a sum of the labels for the k nearest neighbor user profiles, receiving, from the second computing system, a second share of the sum of the labels for the k nearest neighbor user profiles, determining, based on the first share of a sum of the labels and the second share of a sum of the labels, the sum of the labels, determining that the sum of the labels exceeds a threshold, in response to determining that the sum of the labels exceeds a threshold determining, as the inference result, to add the given user to the given user group, and generating the first share of the inference result based on the inference result.

In some aspects, the label for each user profile has a numerical value. Generating the first share of the inference result can include determining a first share of a sum of the labels for the k nearest neighbor user profiles, receiving, from the second computing system, a second share of the sum of the labels for the k nearest neighbor user profiles, determining, based on the first share of a sum of the labels and the second share of a sum of the labels, the sum of the labels, determining, as the inference result, based on the sum of the labels, that the given user is to join the given user group, and generating the first share of the inference result based on the inference result.

In some aspects, the label for each user profile has a categorical value. Generating the first share of the inference result can include, for each label in a set of labels, determining a first share of a frequency at which user profiles in the k nearest neighbor user profiles have the label, receiving, from the second computing system, a second share of the frequency at which user profiles in the k nearest neighbor user profiles have the label, and determining, based on the first share and second share of the frequency at which user profiles in the k nearest neighbor user profiles have the label, the frequency at which users profiles in the k nearest neighbor user profiles have the label. Some aspects can include identifying the label having the highest frequency, assigning, as the inference result, the given user is to join the given user group corresponding to the label having the highest frequency, and generating the first share of the inference result based on the inference result.

Some aspects can include training the first k-nearest neighbor model using a secure MPC process in collaboration with the one or more second computing systems using first secret shares of multiple user profiles maintained by the first computing system and respective second secret shares of the multiple user profiles maintained by one or more second computing systems.

Some aspects can include training the first k-nearest neighbor model. The training can include creating, in collaboration with the second computing system, first shares of a random bit flipping pattern, generating a first share of a bit matrix by projecting a first share of each user profile in the plurality of user profiles onto a set of random projection planes, modifying the first share of the bit matrix by modifying one or more bits of the first share of the bit matrix using the first shares of the bit flipping pattern, providing a first portion of the modified first share of the bit matrix to the second computing system, receiving, from the second computing system, a second half of a modified second share of the bit matrix generated by the second computing system using second shares of the user profiles in the multiple user profiles and second shares of the random bit flipping pattern, and reconstructing, by the first computing system, bit vectors for the second half of the first bit matrix using a second half of the modified first share of the bit matrix and the second half of the modified second share of the bit matrix. Creating, in collaboration with the second computing system, first shares of a random bit flipping pattern can include generating a first m-dimensional vector comprising multiple first elements that each have a value of zero or one, splitting the first m-dimensional vector into two shares, providing a first share of the first m-dimensional vector to the second computing system, receiving a first share of a second m-dimensional vector from the second computing system, and computing, in collaboration with the second computing system, the first share of the random bit flipping pattern using shares of the first and second m-dimensional vectors. In some aspects, the multiple MPC computing systems include more than two MPC computing systems.

In some aspects, the client device computes the given user profile using multiple feature vectors that each include feature values related to events of a user of the client device and a decay rate for each feature vector.

In some aspects, the client device computes the given user profile using multiple feature vectors that each include feature values related to events of a user of the client device. Some aspects include classifying one or more of the feature vectors as sparse feature vectors, classifying one or more of the feature vectors as dense feature vectors. Some aspects include generating the first share of the given user profile and respective second shares of the given user profile for the one or more second computing systems using the sparse feature vectors and dense feature vectors. Generating the first share and the respective one or more second shares of the given user profile can include splitting the sparse feature vector using a Function Secret Sharing (FSS) technique.

The subject matter described in this specification can be implemented in particular embodiments so as to realize one or more of the following advantages. The machine learning techniques described in this document can identify users that have similar interests and expand user group membership while preserving the privacy of users, e.g., without the need to send users' online activity to content platforms. This protects user privacy with respect to such platforms and preserves the security of the data from breaches during transmission or from the platforms. Cryptographic techniques, such as secure multi-party computation (MPC), enable the expansion of user groups based on similarities in user profiles without the use of third-party cookies, which preserves user privacy without negatively impacting the ability to expand the user groups and in some cases provides better user group expansion based on more complete profiles than achievable using third-party cookies. The MPC techniques can ensure that, as long as one of the computing systems in an MPC cluster is honest, no user data can be obtained by any of the computing systems or another party in plaintext. As such, the claimed methods allow the identification, grouping and transmission of user data in a secure manner, without requiring the use of third-party cookies to determine any relations between user data. This is a distinct approach from previous, known methods which generally require third-party cookies to determine relationships between data. By grouping user data in this manner, the efficiency of transmitting data content to user devices is improved as data content that is not relevant to a particular user need not be transmitted. Particularly, third-party cookies are not required thereby avoiding the storage of third-party cookies, improving memory usage. Exponential decay techniques can be used to build user profiles at client devices to reduce the data size of the raw data needed to build the user profiles, thereby reducing data storage requirements of client devices, which often have very limited data storage.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for training and using machine learning models to expand user group membership while preserving user privacy and ensuring data security. In general, rather than creating and maintaining user profiles at computing systems of other entities, such as content platforms, the user profiles are maintained at the client devices of the users. To train the machine learning models, the client devices of the users can send their encrypted user profiles (e.g., as secret shares of the user profiles) along with other data to multiple computing systems of a secure multi-party computation (MPC) cluster, optionally via a content platform. For example, each client device can generate two or more secret shares of the user profile and send a respective secret share to each computing system. The computing systems of the MPC cluster can use MPC techniques to train machine learning models for suggesting user groups for the users based on their profiles in ways that prevent any computing system of the MPC cluster (or other party which is not the user itself) from obtaining any user's profile in plaintext, thereby preserving user privacy. For example, using the secret shares and MPC techniques described in this document enables the machine learning models to be trained and used while the user profile data of each user is encrypted at all times when the data it outside of the user's device. The machine learning models can be k-nearest neighbor (k-NN) models.

After the machine learning models are trained, the machine learning models can be used to suggest one or more user groups for each user based on their profiles. For example, the client device of a user can query the MPC cluster for suggested user groups for that user or to determine whether a user should be added to a particular user group. Various inference techniques can be used, such as binary classification, regression (e.g., using arithmetic mean or root mean square), and/or multiclass classification to identify the user groups. The user group membership of a user can be used in privacy preserving and secure ways to provide content to the user.

Example System for Generating and Using Machine Learning Models

Figure 1:
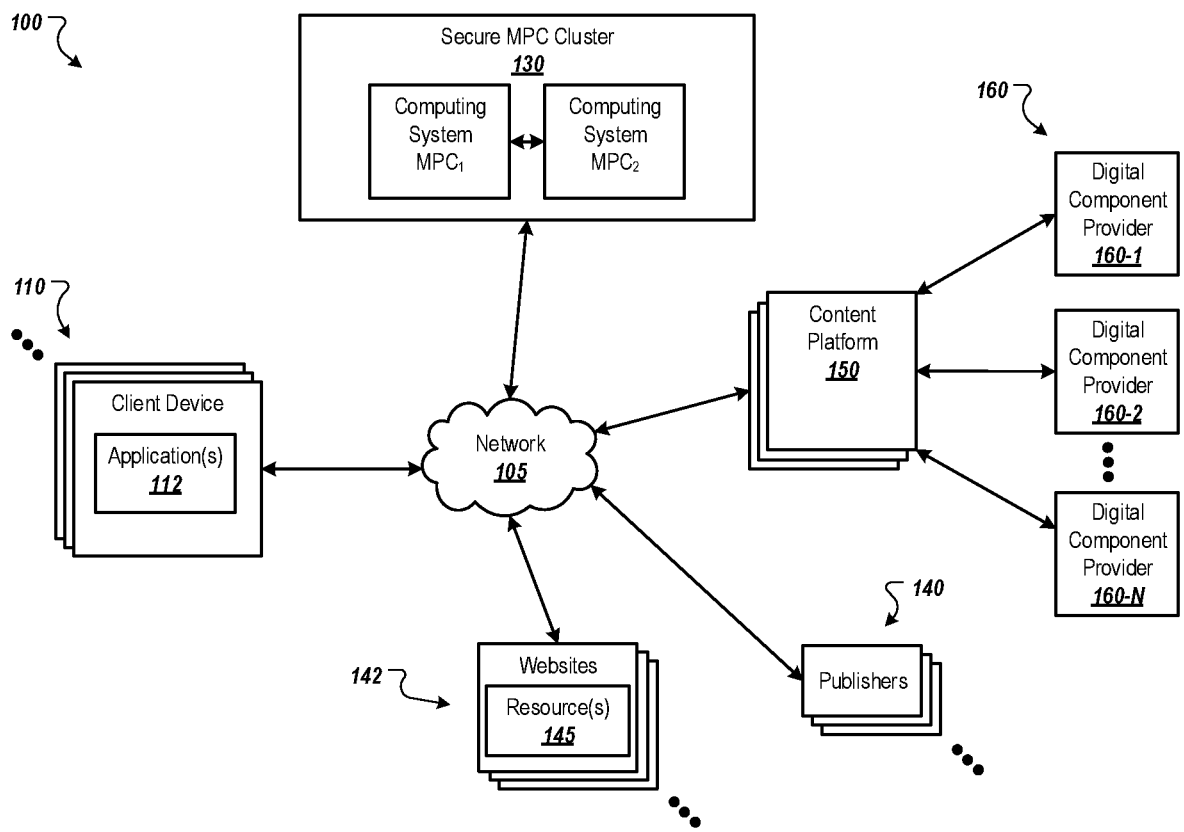
FIG. 1 is a block diagram of an environment in which a secure MPC cluster trains machine learning models and the machine learning models are used to expand user groups.

FIG. 1 is a block diagram of an environment 100 in which a secure MPC cluster 130 trains machine learning models and the machine learning models are used to expand user groups. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, and content platforms 150. The example environment 100 may include many different client devices 110, secure MPC clusters 130, publishers 140, websites 142, and content platforms 150.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, or a gaming device or console.

A client device 110 typically includes applications 112, such as web browsers and/or native applications, to facilitate the sending and receiving of data over the network 105. A native application is an application developed for a particular platform or a particular device (e.g., mobile devices having a particular operating system). Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110.

The content platforms 150 can include supply-side platforms (SSPs) and demand-side platforms (DSPs). In general, the content platforms 150 manage the selection and distribution of digital components on behalf of publishers 140 and digital component providers 160.

Some publishers 140 use an SSP to manage the process of obtaining digital components for digital component slots of its resources and/or applications. An SSP is a technology platform implemented in hardware and/or software that automates the process of obtaining digital components for the resources and/or applications. Each publisher 140 can have a corresponding SSP or multiple SSPs. Some publishers 140 may use the same SSP.

Digital component providers 160 can create (or otherwise publish) digital components that are presented in digital component slots of publisher's resources and applications. The digital component providers 160 can use a DSP to manage the provisioning of its digital components for presentation in digital component slots. A DSP is a technology platform implemented in hardware and/or software that automates the process of distributing digital components for presentation with the resources and/or applications. A DSP can interact with multiple supply-side platforms SSPs on behalf of digital component providers 160 to provide digital components for presentation with the resources and/or applications of multiple different publishers 140. In general, a DSP can receive requests for digital components (e.g., from an SSP), generate (or select) a selection parameter for one or more digital components created by one or more digital component providers based on the request, and provide data related to the digital component (e.g., the digital component itself) and the selection parameter to an SSP. The SSP can then select a digital component for presentation at a client device 110 and provide, to the client device 110, data that causes the client device 110 to present the digital component.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users, or other group types involving similar user data. For example, a user can be assigned to a user interest group when the users visit particular resources or perform particular actions at the resource (e.g., interact with a particular item presented on a web page or add the item to a virtual cart). In another example, a user can be assigned to a user group based on a history of activity, e.g., a history of resources visited and/or actions performed at the resources. In some implementations, the user groups can be generated by the digital component providers 160. That is, each digital component provider 160 can assign users to their user groups when the users visit electronic resources of the digital component providers 160.

To protect user privacy, a user's group membership can be maintained at the user's client device 110, e.g., by one of the applications 112, or the operating system of the client device 110, rather than by a digital component provider, content platform, or other party. In a particular example, a trusted program (e.g., a web browser or the operating system can maintain a list of user group identifiers ("user group list") for a user using the web browser or another application. The user group list can include a group identifier for each user group to which the user has been added. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 presents a resource or application content related to a digital component provider 160, or a web page on a website 142, the resource can request that the application 112 add one or more user group identifiers to the user group list. In response, the application 112 can add the one or more user group identifiers to the user group list and store the user group list securely.

The content platforms 150 can use the user group membership of a user to select digital components or other content that may be of interest to the user or may be beneficial to the user/user device in another way. For example, such digital components or other content may comprise data that improves a user experience, improves the running of a user device or benefits the user or user device in some other way. However, the user group identifiers of the user group list of a user can be provided in ways that prevent the content platforms 150 from correlating user group identifiers with particular users, thereby preserving user privacy when using user group membership data to select digital components.

The application 112 can provide user group identifiers from the user group list to a trusted computing system that interacts with the content platforms 150 to select digital components for presentation at the client device 110 based on the user group membership in ways that prevent the content platforms 150 or any other entities which are not the user itself from knowing a user's complete user group membership.

In some cases, it is beneficial to users and to digital component providers to expand user groups to include users that have similar interests or other similar data as the users that are already members of the user group. For example, a first user may be interested in snow skiing and may be a member of a user group for a particular ski resort. A second user may also be interested in skiing, but unaware of this ski resort and not a member of the ski resort. If the two users have similar interests or data, e.g., similar user profiles, the second user may be added to the user group for the ski resort so that the second user receives content, e.g., digital components, related to the ski resort and that may be of interest or otherwise beneficial to the second user or a user device thereof. In other words, user groups may be expanded to include other users having similar user data.

Advantageously, users can be added to user groups without the use of third-party cookies. As described above, the user profiles can be maintained at the client device 110. This preserves user privacy by precluding a user's cross-domain browsing history to be shared with outside parties, reduces bandwidth consumed by transmitting the cookies over the network 105 (which, aggregated over millions of users is substantial), reduces the storage requirements of content platforms 150 that typically store such information, and reduces battery consumption used by client devices 110 to maintain and transmit the cookies.

The secure MPC cluster 130 can train machine learning models that suggest, or can be used to generate suggestions of, user groups to users (or their applications 112) based on the user's profiles. The secure MPC cluster 130 includes two computing systems $MPC_1$ and $MPC_2$ that perform secure MPC techniques to train the machine learning models. Although the example MPC cluster 130 includes two computing systems, more computing systems can also be used as long as the MPC cluster 130 includes more than one computing system. For example, the MPC cluster 130 can include three computing systems, four computing systems, or another appropriate number of computing systems. Using more computing systems in the MPC cluster 130 can provide more security and fault tolerance, but can also increase the complexity of the MPC processes.

The computing systems $MPC_1$ and $MPC_2$ can be operated by different entities. In this way, each entity may not have access to the complete user profiles in plaintext. Plaintext is text that is not computationally tagged, specially formatted, or written in code, or data, including binary files, in a form that can be viewed or used without requiring a key or other decryption device, or other decryption process. For example, one of the computing systems $MPC_1$ or $MPC_2$ can be operated by a trusted party different from the users, the publishers 140, the content platform 150, and the digital component providers 160. For example, an industry group, governmental group, or browser developer may maintain and operate one of the computing systems $MPC_1$ and $MPC_2$. The other computing system may be operated by a different one of these groups, such that a different trusted party operates each computing system $MPC_1$ and $MPC_2$. Preferably, the different parties operating the different computing systems $MPC_1$ and $MPC_2$ have no incentive to collude to endanger user privacy. In some implementations, the computing systems $MPC_1$ and $MPC_2$ are separated architecturally and are monitored to not communicate with each other outside of performing the secure MPC processes described in this document.

Figure 4:
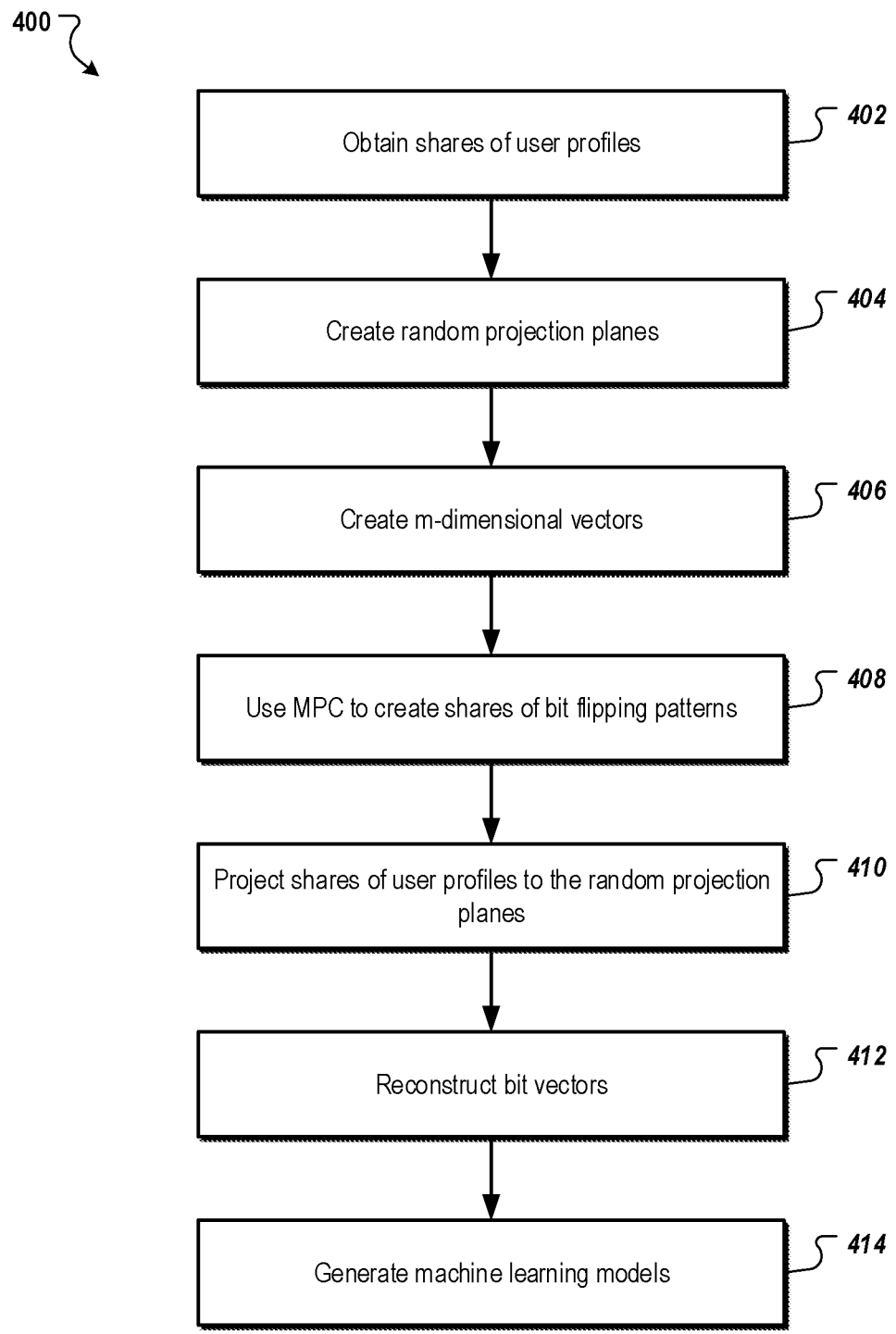
FIG. 4 is a flow diagram that illustrates an example process for generating a machine learning model.

In some implementations, the MPC cluster 130 trains one or more k-NN models for each content platform 150 and/or for each digital component provider 160. For example, each content platform 150 can manage the distribution of digital components for one or more digital component providers 160. A content platform 150 can request that the MPC cluster 130 train a k-NN model for one or more of the digital component providers 160 for which the content platform 150 manages the distribution of digital components. In general, a k-NN model represents distances between the user profiles (and optionally additional information) of a set of users. Each k-NN model of a content platform can have a unique model identifier. An example process for training a k-NN model is illustrated in FIG. 4 and described below.

After training a k-NN model for a content platform 150, the content platform 150 can query, or have the application 112 of a client device 110 query the k-NN model to identify one or more user groups for a user of the client device 110. For example, the content platform 150 can query the k-NN model to determine whether a threshold number of the "k" user profiles nearest to the user are members of a particular user group. If so, the content platform 150 may add the user to that user group. If a user group is identified for the user, the content platform 150 or the MPC cluster 130 can request that the application 112 add the user to the user group. If approved by the user and/or the application 112, the application 112 can add a user group identifier for the user group to the user group list stored at the client device 110.

In some implementations, an application 112 can provide a user interface that enables a user to manage the user groups to which the user is assigned. For example, the user interface can enable the user to remove user group identifiers, prevent all or particular resources 145, publishers 140, content platforms 150, digital component providers 160, and/or MPC clusters 130 from adding the user to a user group (e.g., prevent the entity from adding user group identifiers to the list of user group identifiers maintained by the application 112). This provides better transparency, choice/consent, and control for the user.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example Process for Generating and Using Machine Learning Models

Figure 2:
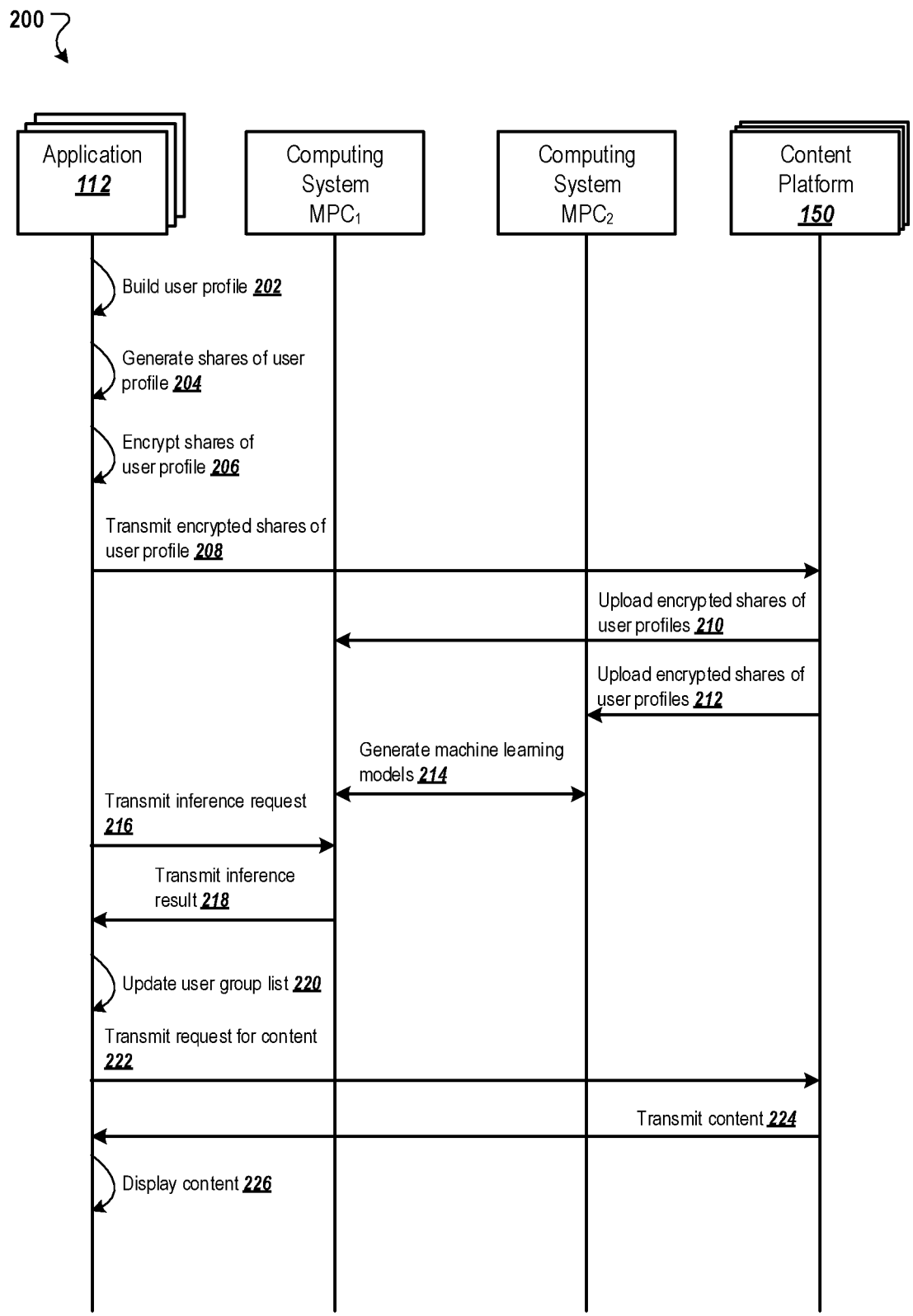
FIG. 2 is a swim lane diagram of an example process for training a machine learning model and using the machine learning model to add users to user groups.

FIG. 2 is a swim lane diagram of an example process 200 for training a machine learning model and using the machine learning model to add users to user groups. Operations of the process 200 can be implemented, for example, by the client device 110, the computing systems $MPC_1$ and $MPC_2$ of the MPC cluster 130, and a content platform 150. Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two computing systems can also be used to perform similar processes.

A content platform 150 can initiate the training and/or updating of one of its machine learning models by requesting that applications 112 running on client devices 110 generate a user profile for their respective users and upload secret-shared and/or encrypted versions of the user profiles to the MPC cluster 130. For the purposes of this document, secret shares of user profiles can be considered encrypted versions of the user profiles as the secret shares are not in plaintext. In generation, each application 112 can store data for a user profile and generate the updated user profile in response to receiving a request from the content platform 150. As the content of a user profile and the machine learning models differ for different content platforms 150, the application 112 running on a user's client device 110 can maintain data for multiple user profiles and generate multiple user profiles that are each specific to particular content platforms, or particular model owned by a particular content platform.

An application 112 running on a client device 110 builds a user profile for a user of the client device 110 (202). The user profile for a user can include data related to events initiated by the user and/or events that could have been initiated by the user with respect to electronic resources, e.g., web pages or application content. The events can include views of electronic resources, views of digital components, user interactions, or the lack of user interactions, with (e.g., selections of) electronic resources or digital components, conversions that occur after user interaction with electronic resources, and/or other appropriate events related to the user and electronic resources.

A user profile for a user can be specific to a content platform 150, or selected machine learning models owned by the content platform 150. For example, as described in more detail below with reference to FIG. 3, each content platform 150 can request that the application 112 generate or update a user profile specific to that content platform 150.

Figure 3:
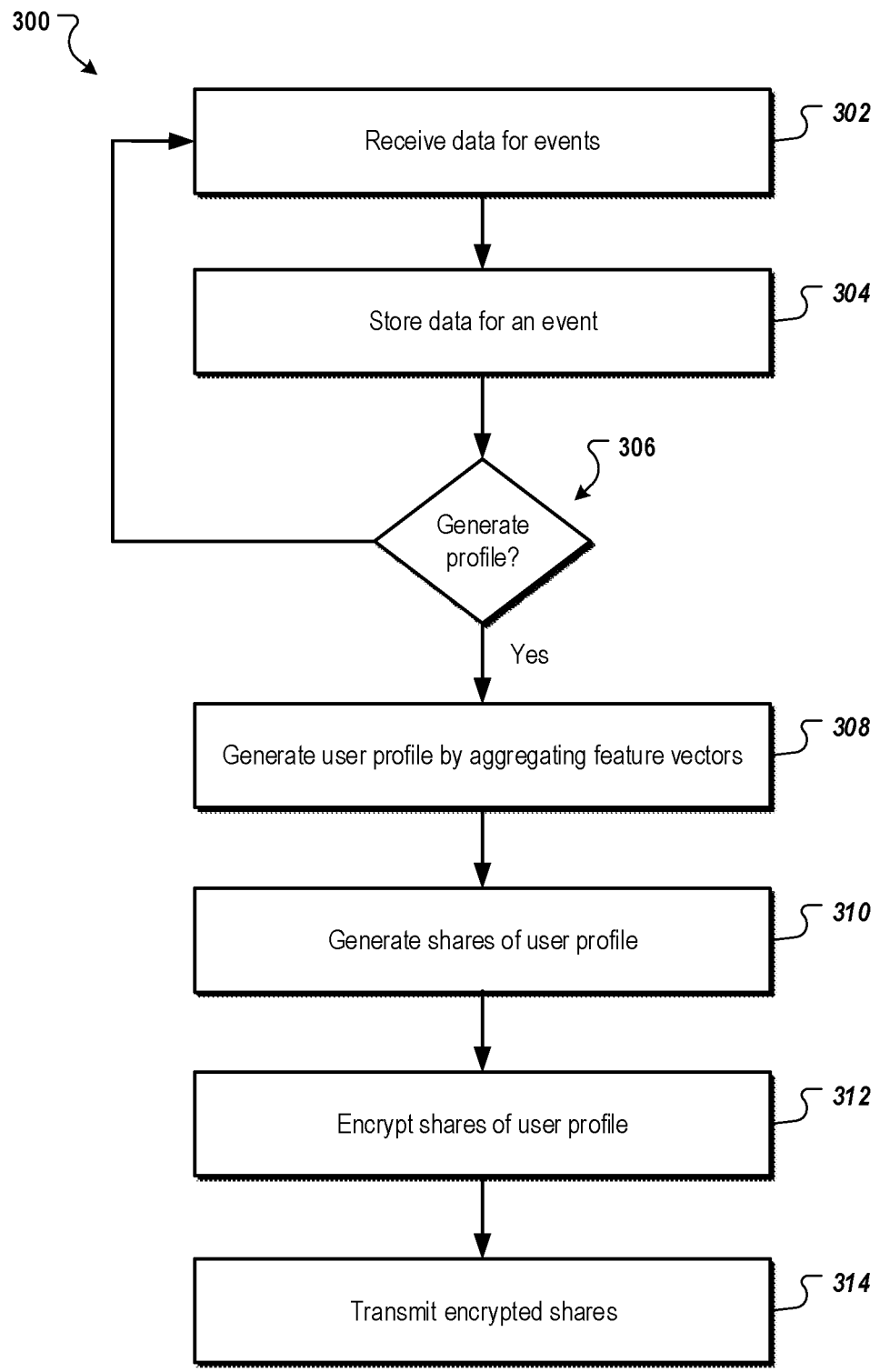
FIG. 3 is a flow diagram that illustrates an example process for generating a user profile and sending shares of the user profile to an MPC cluster.

The user profile for a user can be in the form of a feature vector. For example, the user profile can be an n-dimensional feature vector. Each of the n dimensions can correspond to a particular feature and the value of each dimension can be the value of the feature for the user. For example, one dimension may be for whether a particular digital component was presented to (or interacted with by) the user. In this example, the value for that feature could be "1" if the digital component was presented to (or interacted with by) the user or "0" if the digital component has not been presented to (or interacted with by) the user. An example process for generating a user profile for a user is illustrated in FIG. 3 and described below.

In some implementations, a content platform 150 may want to train machine learning models based on additional signals, such as contextual signals, signals related to particular digital components, or signals related to the user of which the application 112 may not be aware or to which the application 112 may not have access, such as the current weather at the user's location. For example, the content platform 150 may want to train a machine learning model to predict whether a user will interact with a particular digital component if the digital component is presented to the user in a particular context. In this example, the contextual signals can include, for each presentation of a digital component to a user, the geographic location of the client device 110 at the time (if permission is granted by the user), signals describing the content of the electronic resource with which the digital component is presented, and signals describing the digital component, e.g., the content of the digital component, the type of digital components, where on the electronic resource the digital component is presented, etc. In another example, one dimension may be for whether the digital component presented to the user is of a particular type. In this example, the value could be 1 for travel, 2 for cuisine, 3 for movie, etc. For ease of subsequent description, P will represent both user profile and additional signals (e.g., contextual signals and/or digital component-level signals) associated with the i-th user profile.

The application 112 generates shares of the user profile $P_i$ for the user (204). In this example, the application 112 generates two shares of the user profile $P_i$, one for each computing system of the MPC cluster 130. Note that each share by itself can be a random variable that by itself does not reveal anything about the user profile. Both shares would need to be combined to get the user profile. If the MPC cluster 130 includes more computing systems that participate in the training of a machine learning model, the application 112 would generate more shares, one for each computing system. In some implementations, to protect user privacy, the application 112 can use a pseudorandom function to split the user profile $P_i$ into shares. That is, the application 112 can use pseudorandom function $PRF(P_i)$ to generate two shares $\{[P_{i,1}],[P_{i,2}]\}$. The exact splitting can depend on the secret sharing algorithm and crypto library used by the application 112.

In some implementations, the application 112 can also provide one or more labels to the MPC cluster 130. Although the labels may not be used in training the machine learning models of certain architecture (e.g. k-NN), the labels can be used to fine-tune hyperparameters controlling the model training process (e.g., the value of k), or evaluate the quality of the machine learning models trained, or make predictions, i.e. determine whether to suggest a user group for a user. The labels can include, for example, one or more of the user group identifiers for the user and for which the content platform 150 has access. That is, the labels can include the user group identifiers for the user groups managed by the content platform 150 or for which the content platform 150 has read access. In some implementations, a single label includes multiple user group identifiers for the user. In some implementations, the label for a user can be heterogeneous and include all user groups that include the user as a member and additional information, e.g., whether the user interacted with a given digital component. This enables the k-NN model to be used to predict whether another user will interact with the given digital component. A label for each user profile can indicate user group membership for a user corresponding to the user profile.

The label for the user profiles are predictive of user groups to which a user corresponding to an input will be, or should be added. For example, the labels corresponding to the k nearest neighbor user profiles to the input user profile are predictive of user groups that the user corresponding to the input user profile will or should join, e.g., based on the similarity between the user profiles. These predictive labels can be used to suggest user groups to the user or to request that the application added the user to the user groups corresponding to the labels.

If labels are included, the application 112 can also split each $label_i$ into shares, e.g., $[label_{i,1}]$ and $[label_{i,2}]$. In this way, without collusion between the computing systems $MPC_1$ and $MPC_2$, neither computing system $MPC_1$ nor $MPC_2$ can reconstruct $P_i$ from $[P_{i,1}]$ or $[P_{i,2}]$ or reconstruct $label_i$ from $[label_{i,1}]$ or $[label_{i,2}]$.

The application 112 encrypts the shares $[P_{i,1}]$ or $[P_{i,2}]$ of the user profile $P_i$ and/or the shares $[label_{i,1}]$ or $[label_{i,2}]$ of each label $label_i$ (206). In some implementations, the application 112 generates a composite message of the first share $[P_{i,1}]$ of the user profile $P_i$ and the first share $[label_{i,1}]$ of the label $label_i$ and encrypts the composite message using an encryption key of the computing system $MPC_1$. Similarly, application 112 generates a composite message of the second share $[P_{i,2}]$ of the user profile $P_i$ and the second share $[label_{i,2}]$ of the label $label_i$ and encrypts the composite message using an encryption key of the computing system $MPC_2$. These functions can be represented as $PubKeyEncrypt([P_{i,1}]||[label_{i,1}], MPC_1)$ and $PubKeyEncrypt([P_{i,2}]||[label_{i,2}], MPC_2)$, where PubKeyEncrypt represents a public key encryption algorithm using the corresponding public key of $MPC_1$ or $MPC_2$. The symbol "||" represents a reversible method to compose complex messages from multiple simple messages, e.g., JavaScript Object Notation (JSON), Concise Binary Object Representation (CBOR), or protocol buffer.

The application 112 provides the encrypted shares to the content platform 150 (208). For example, the application 112 can transmit the encrypted shares of the user profile and the label to the content platform 150. As each share is encrypted using an encryption key of the computing system $MPC_1$ or $MPC_2$, the content platform 150 cannot access the user's user profile or the label.

The content platform 150 can receive shares of user profiles and shares of labels from multiple client devices. The content platform 150 can initiate the training of a machine learning model by uploading the shares of the user profiles to the computing systems $MPC_1$ and $MPC_2$. Although the labels may not be used in the training process, the content platform 150 can upload the shares of the labels to the computing systems $MPC_1$ and $MPC_2$ for use when evaluating the model quality or querying the model later.

The content platform 150 uploads the first encrypted shares (e.g., $PubKeyEncrypt([P_{i,1}]||[label_{i,1}], MPC_1)$) received from each client device 110 to the computing system $MPC_1$ (210). Similarly, the content platform 150 uploads the second encrypted shares (e.g., $PubKeyEncrypt([P_{i,2}]||[label_{i,2}], MPC_2)$) to the computing system $MPC_2$ (212). Both uploads can be in batches and can include the encrypted shares of user profiles and labels received during a particular time period for training the machine learning model.

In some implementations, the order in which the content platform 150 uploads the first encrypted shares to the computing system $MPC_1$ must match the order in which the content platform 150 uploads the second encrypted shares to the computing system $MPC_2$. This enables the computing systems $MPC_1$ and $MPC_2$ to properly match two shares of the same secret, e.g., two shares of the same user profile.

In some implementations, the content platform 150 may explicitly assign the same pseudorandomly or sequentially generated identifier to shares of the same secret to facilitate the matching. While some MPC techniques can rely on random shuffling of input or intermediate results, the MPC techniques described in this document may not include such random shuffling and may instead rely on the upload order to match.

In some implementations, the operations 208, 210 and 212 can be replaced by alternative process where the application 112 directly uploads $[P_{i,1}]||[label_{i,1}]$ to $MPC_1$, and $[P_{i,2}]||[label_{i,2}]$ to $MPC_2$. This alternative process can reduce the infrastructure cost of the content platform 150 to support the operations 208, 210 and 212, and reduce the latency to start training or updating the machine learning models in $MPC_1$ and $MPC_2$. For example, this eliminates the transmittal of data to the content platform 150, which the content platform 150 then transmits to $MPC_1$ and $MPC_2$. Doing so reduces the amount of data transmitted over the network 105 and reduces the complexity of the logic of the content platform 150 in handling such data.

The computing systems $MPC_1$ and $MPC_2$ generate a machine learning model (214). Each time a new machine learning model is generated based on user profile data can be referred to as a training session. The computing systems $MPC_1$ and $MPC_2$ can train a machine learning model based on the encrypted shares of the user profiles received from the client devices 110. For example, the computing systems $MPC_1$ and $MPC_2$ can use MPC techniques to train a k-NN model based on the shares of the user profiles.

To minimize or at least reduce the crypto computation, and thus the computational burden placed on the computing systems $MPC_1$ and $MPC_2$ to protect user privacy and data during both model training and inference, the MPC cluster 130 can use random projection techniques, e.g., SimHash, to quantify the similarity between two user profiles $P_i$ and $P_j$ quickly, securely, and probabilistically. A SimHash is a technique that enables a quick estimate of the similarity between two data sets. The similarity between the two user profiles $P_i$ and $P_j$ can be determined by determining the Hamming distance between two bit vectors that represent the two user profiles $P_i$ and $P_j$, which is inversely proportional to the cosine distance between the two user profiles with high probability.

Conceptually, for each training session, m random projection hyperplanes $U=\{U_1, U_2, \ldots, U_m\}$ can be generated. The random projection hyperplanes can also be referred to as random projection planes. One objective of the multi-step computation between the computing systems $MPC_1$ and $MPC_2$ is to create a bit vector $B_i$ of length m for each user profile $P_i$ used in the training of the k-NN model. In this bit vector $B_i$, each bit $B_{i,j}$ represents the sign of a dot product of one of the projection planes $U_j$ and the user profile $P_i$, i.e., $B_{i,j}=\text{sign}(U_j \odot P_i)$ for all $j \in [1, m]$ where $\odot$ denotes the dot product of two vectors of equal length. That is, each bit represents which side of the plane $U_j$ the user profile $P_i$ is located. A bit value of one represents a positive sign and a bit value of zero represents a negative sign.

At each end of the multi-step computation, each of the two computing systems $MPC_1$ and $MPC_2$ generates an intermediate result that includes a bit vector for each user profile in cleartext, a share of each user profile, and a share of the label for each user profile. For example, the intermediate result for computing system $MPC_1$ can be the data shown in Table 1 below. The computing system $MPC_2$ would have a similar intermediate result but with a different share of each user profile and each label. To add extra privacy protection, each of the two servers in the MPC cluster 130 can only get half of the m-dimensional bit vectors in cleartext, e.g., computing system $MPC_1$ gets the first m/2 dimension of all the m-dimension bit vectors, computing system $MPC_2$ gets the second m/2 dimension of all the m-dimension bit vectors.

TABLE 1

| Bit Vector in Cleartext | $MPC_1$ Share for $P_i$ | $MPC_1$ Share for $label_i$ |
|---|---|---|
| ... | ... | ... |
| $B_i$ | ... | ... |
| $B_{i+1}$ | ... | ... |
| ... | ... | ... |

Given two arbitrary user profile vectors $P_i$ and $P_j$ of unit length $i \neq j$, it has been shown that the Hamming distance between the bit vectors $B_i$ and $B_j$ for the two user profile vectors $P_i$ and $P_j$ is proportional to the cosine distance between the user profile vectors $P_i$ and $P_j$ with high probability, assuming that the number of random projections m is sufficiently large.

Based on the intermediate result shown above and because the bit vectors $B_i$ are in cleartext, each computing system $MPC_1$ and $MPC_2$ can independently create, e.g., by training, a respective k-NN model using a k-NN algorithm. The computing systems $MPC_1$ and $MPC_2$ can use the same or different k-NN algorithms. An example process for training a k-NN model is illustrated in FIG. 4 and described below. Once the k-NN models are trained, the application 112 can query the k-NN models to determine whether to add a user to a user group.

The application 112 submits an inference request to the MPC cluster 130 (216). In this example, the application 112 transmits the inference request to computing system $MPC_1$. In other examples, the application 112 can transmit the inference request to computing system $MPC_2$. The application 112 can submit the inference request in response to a request from the content platform 150 to submit the inference request. For example, the content platform 150 can request the application 112 to query the k-NN model to determine whether the user of the client device 110 should be added to a particular user group. This request can be referred to an inference request to infer whether the user should be added to the user group.

To initiate an inference request, the content platform 150 can send, to the application 112, an inference request token $M_{infer}$. The inference request token $M_{infer}$ enables servers in the MPC cluster 130 to validate that the application 112 is authorized to query a particular machine learning model owned by a particular domain. The inference request token $M_{infer}$ is optional if the model access control is optional. The inference request token $M_{infer}$ can have the following items shown and described in Table 2 below.

TABLE 2

| Item No. | Content | Description |
|---|---|---|
| 1 | Content Platform Domain (e.g., eTLD + 1 domain) | Content platform's domain that uniquely identifies the content platform |
| 2 | Model Identifier | Unique identifier for the content platform's machine learning model |
| 3 | k | How many nearest neighbors to fetch |
| 4 | Aggregation Function | The aggregation function applied to the labels of the k nearest neighbors |
| 5 | Aggregation Function Parameters | Additional parameters used by the aggregation function |
| 6 | Token Creation Timestamp | Timestamp indicating when this token is created |
| 7 | Operation | Infer request operation |
| 8 | Digital Signature | The content platform's digital signature over items 1-7 |

In this example, the inference request token $M_{infer}$ includes seven items and a digital signature generated based on the seven items using a private key of the content platform 150. The eTLD+1 is the effective top-level domain (eTLD) plus one level more than the public suffix. An example eTLD+1 is "example.com" where ".com" is the top-level domain.

To request an inference for a particular user, the content platform 150 can generate an inference request token $M_{infer}$ and send the token to the application 112 running on the user's client device 110. In some implementations, the content platform 150 encrypts the inference request token $M_{infer}$ using a public key of the application 112 so that only the application 112 can decrypt the inference request token $M_{infer}$ using its confidential private key that corresponds to the public key. That is, the content platform can send, to the application 112, PubKeyEnc($M_{infer}$, application_public_key).

The application 112 can decrypt and verify the inference request token $M_{infer}$. The application 112 can decrypt the encrypted inference request token $M_{infer}$ using its private key. The application 112 can verify the inference request token $M_{infer}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the inference request token $M_{infer}$ is valid, the application 112 can query the MPC cluster 130.

Conceptually, the inference request can include the model identifier for the machine learning model, the current user profile $P_i$, k (the number of nearest neighbors to fetch), optionally additional signals (e.g., contextual signals or digital component signals), the aggregation function, and the aggregation function parameters. However, to prevent leaking the user profile $P_i$ in plaintext form to either computing system $MPC_1$ or $MPC_2$, and thereby preserve user privacy, the application 112 can split the user profile $P_i$ into two shares $[P_{i,1}]$ and $[P_{i,2}]$ for $MPC_1$ and $MPC_2$, respectively. The application 112 can then select one of the two computing systems $MPC_1$ or $MPC_2$, e.g., randomly or pseudo-randomly, for the query. If the application 112 selects computing system $MPC_1$, the application 112 can send a single request to computing system $MPC_1$ with the first share $[P_{i,1}]$ and an encrypted version of the second share, e.g., PubKeyEncrypt($[P_{i,2}]$, $MPC_2$). In this example, the application 112 encrypts the second share $[P_{i,2}]$ using a public key of the computing system $MPC_2$ to prevent computing system $MPC_1$ from accessing $[P_{i,2}]$, which would enable computing system $MPC_1$ to reconstruct the user profile $P_i$ from $[P_{i,1}]$ and $[P_{i,2}]$.

As described in more detail below, the computing systems $MPC_1$ and $MPC_2$ collaboratively compute the k nearest neighbors to the user profile $P_i$. The computing systems $MPC_1$ and $MPC_2$ can then use one of several possible machine learning techniques (e.g., binary classification, multiclass classification, regression, etc.) to determine, based on the k nearest neighbor user profiles, whether to add the user to a user group. For example, the aggregation function can identify the machine learning technique (e.g., binary, multiclass, regression) and the aggregation function parameters can be based on the aggregation function. The aggregation function can define a computation, e.g., a sum, logical AND or OR, or another appropriate function that is performed using the parameters. For example, the aggregation function can be in the form of an equation that includes the function and the parameters that are used in the equation.

In some implementations, the aggregation function parameters can include a user group identifier for a user group for which the content platform 150 is querying the k-NN model for the user. For example, the content platform 150 may want to know whether to add a user to a user group related to hiking and that has a user group identifier "hiking." In this example, the aggregation function parameter can include the "hiking" user group identifier. In general, the computing systems $MPC_1$ and $MPC_2$ can determine whether to add the user to the user group based on the number of the k nearest neighbors that are a member of the user group, e.g., based on their labels.

Figure 5:
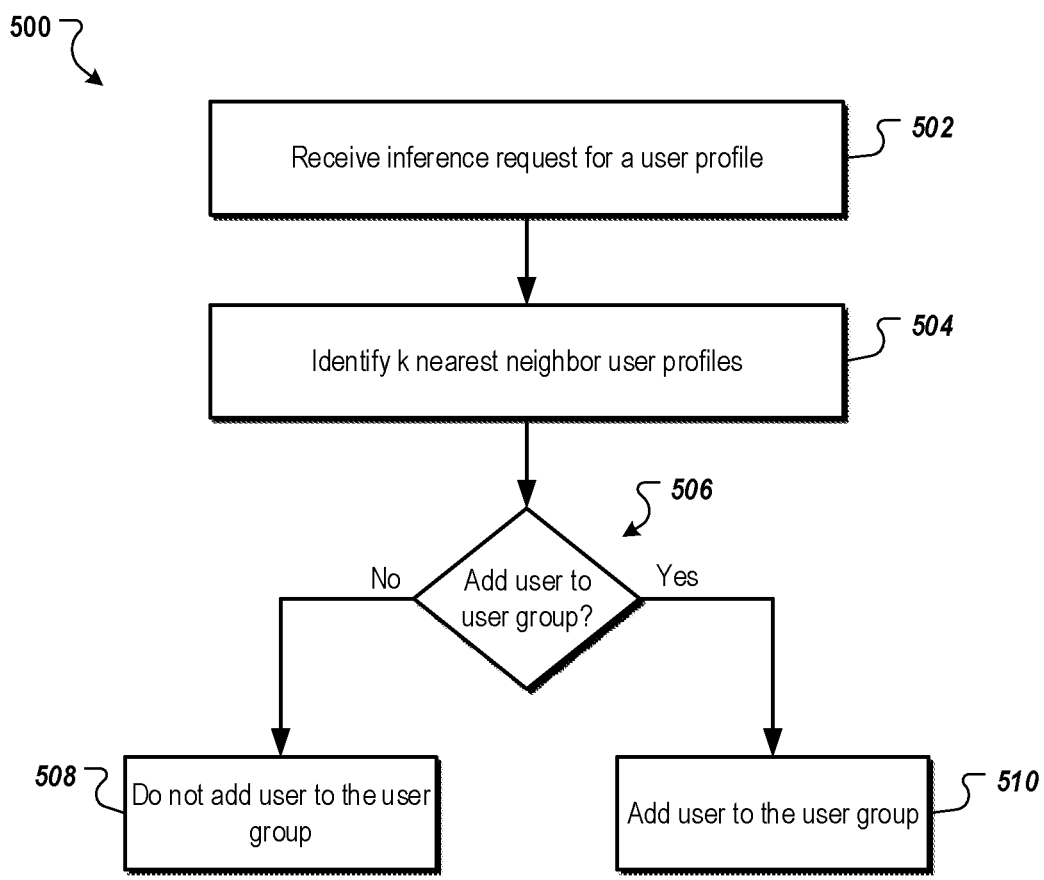
FIG. 5 is a flow diagram that illustrates an example process for adding a user to user groups using machine learning models.

The MPC cluster 130 provides an inference result to the application 112 (218). In this example, the computing system $MPC_1$ that received the query sends the inference result to the application 112. The inference result can indicate whether the application 112 should add the user to zero or more user groups. For example, the user group result can specify a user group identifier for the user group. However, in this example, the computing system $MPC_1$ would know the user group. To prevent this, the computing system $MPC_1$ may compute a share of the inference result and the computing system $MPC_2$ may compute another share of the same inference result. The computing system $MPC_2$ can provide an encrypted version of its share to the computing system $MPC_1$, where the share is encrypted using a public key of the application 112. The computing system $MPC_1$ can provide, to the application 112, its share of the inference result and the encrypted version of computing system $MPC_2$'s share of the user group result. The application 112 can decrypt computing system $MPC_2$'s share and calculate the inference result from the two shares. An example process for querying a k-NN model to determine whether to add a user to a user group is illustrated in FIG. 5 and described below. In some implementations, to prevent computing system $MPC_1$ from falsifying computing system $MPC_2$'s result, computing system $MPC_2$ digitally signs its result either before or after encrypting its result using the public key of the application 112. The application 112 verifies computing system $MPC_2$'s digital signature using the public key of $MPC_2$.

The application 112 updates the user group list for the user (220). For example, if the inference result is to add the user to a particular user group, the application 112 can add the user to the user group. In some implementations, the application 112 can prompt the user for permission to add the user to the user group.

The application 112 transmits a request for content (222). For example, the application 112 can transmit, to the content platform 150, a request for a digital component in response to loading an electronic resource that has a digital component slot. In some implementations, the request can include one or more user group identifiers for user groups that include the user as a member. For example, the application 112 can obtain one or more user group identifiers from the user group list and provide the user group identifier(s) with the request. In some implementations, techniques can be used to prevent the content platform from being able to associate the user group identifier with the user, the application 112, and/or the client device 110 from which the request is received.

The content platform 150 transmits content to the application 112 (224). For example, the content platform 150 can select a digital component based on the user group identifier(s) and provide the digital component to the application 112. In some implementations, the content platform 150, in collaboration with the application 112, selects a digital component based on the user group identifier(s), without leaking the user group identifier(s) out of the application 112.

The application 112 displays or otherwise implements the received content (226). For example, the application 112 can display a received digital component in a digital component slot of an electronic resource.

Example Process for Generating User Profiles

FIG. 3 is a flow diagram that illustrates an example process 300 for generating a user profile and sending shares of the user profile to an MPC cluster. Operations of the process 300 can be implemented, for example, by the client device 110 of FIG. 1, e.g., by the application 112 running on the client device 110. Operations of the process 300 can also be implemented as instructions stored on one or more computer readable media which may be non-transitory, and execution of the instructions by one or more data processing apparatus can cause the one or more data processing apparatus to perform the operations of the process 300.

An application 112 executing on a user's client device 110 receives data for an event (302). The event can be, for example, a presentation of an electronic resource at the client device 110, a presentation of a digital component at the client device 110, a user interaction with an electronic resource or digital component at the client device 110, or a conversion for a digital component, or the lack of user interaction with or conversion for an electronic resource or digital component presented. When an event occurs, a content platform 150 can provide data related to the event to the application 112 for use in generating a user profile for the user.

The application 112 can generate a different user profile for each content platform 150. That is, the user profile of a user and for a particular content platform 150 may only include event data received from the particular content platform 150. This preserves user privacy by not sharing with content platforms data related to events of other content platforms. In some implementations, the application 112, per the request of the content platform 150, may generate a different user profile for each machine learning model owned by the content platform 150. Based on the design goal, different machine learning models may require different training data. For example, a first model may be used to determine whether to add a user to a user group. A second model may be used to predict whether a user will interact with a digital component. In this example, the user profiles for the second model can include additional data, e.g., whether the user interacted with the digital component, that the user profiles for the first model do not have.

The content platform 150 can send the event data in the form of a profile update token $M_{update}$. The profile update token $M_{update}$ have the following items shown and described in Table 3 below.

TABLE 3

| Item No. | Content | Description |
| --- | --- | --- |
| 1 | Content Platform Domain (e.g., eTLD + 1 domain) | Content platform's domain that uniquely identifies the content platform |
| 2 | Model Identifier | Unique identifier for the content platform's machine learning model. This item can have multiple values if the same feature vector should be applicable for the training of multiple machine learning models for the same owner domain. |

TABLE 3-continued

| Item No. | Content | Description |
| --- | --- | --- |
| 3 | Profile Record | n-dimensional feature vector determined by the content platform based on the event |
| 4 | Token Creation Timestamp | Timestamp indicating when this token is created |
| 5 | Expiration Time | A date and time at which the feature vector will expire and not be used for the user profile calculation. |
| 6 | Profile Decay Rate | Optional rate that defines the rate at which the weight of this event's data decays in the user profile |
| 7 | Operation | Accumulate user profile |
| 8 | Digital Signature | The content platform's digital signature over items 1-7 |

The model identifier identifies the machine learning model, e.g., k-NN model, for which the user profile will be used to train or used to make a user group inference. The profile record is an n-dimensional feature vector that includes data specific to the event, e.g., the type of event, the electronic resource or digital component, time at which the event occurred, and/or other appropriate event data that the content platform 150 wants to use in training the machine learning model and making user group inferences. The digital signature is generated based on the seven items using a private key of the content platform 150.

In some implementations, to protect the update token $M_{update}$ during transmission, the content platform 150 encrypts the update token $M_{update}$ prior to sending the update token $M_{update}$ to the application 112. For example, the content platform 150 can encrypt the update token $M_{update}$ using a public key of the application, e.g., PubKeyEnc ($M_{update}$, application_public_key).

In some implementations, the content platform 150 can send the event data to the application 112 without encoding the event data or the update request in the form of a profile update token $M_{update}$. For example, a script originated from the content platform 150 running inside the application 112 may directly transmit the event data and the update request to the application 112 via a script API, where the application 112 relies on World Wide Web Consortium (W3C) origin-based security model and/or (Hypertext Transfer Protocol Secure) HTTPS to protect the event data and update request from falsification or leaking.

The application 112 stores the data for the event (304). If the event data is encrypted, the application 112 can decrypt the event data using its private key that corresponds to the public key used to encrypt the event data. If the event data is sent in the form of an update token $M_{update}$, the application 112 can verify the update token $M_{update}$ before storing the event data. The application 112 can verify the update token $M_{update}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the update token $M_{update}$ is valid, the application 112 can store the event data, e.g., by storing the n-dimensional profile record. If any verification fails, the application 112 may ignore the update request, e.g., by not storing the event data.

For each machine learning model, e.g., for each unique model identifier, the application 112 can store event data for that model. For example, the application 112 can maintain, for each unique model identifier, a data structure that includes a set of n-dimensional feature vectors (e.g., the profile records of the update tokens) and, for each feature vector, the expiration time. Each feature vector can include feature values for features related to events for the user of the client device 110. An example data structure for a model identifier is shown in Table 4 below.

TABLE 4

| Feature Vector | Expiration |
|---|---|
| n-dimensional feature vector | Expiration time |
| ... | ... |

Upon receiving a valid update token $M_{update}$, the application 112 can update the data structure for the model identifier included in the update token $M_{update}$ by adding the feature vector and expiration time of the update token $M_{update}$ to the data structure. Periodically, the application 112 can purge expired feature vectors from the data structure to reduce storage size.

The application 112 determines whether to generate a user profile (306). For example, the application 112 may generate a user profile for a particular machine learning model in response to a request from the content platform 150. The request may be to generate the user profile and return shares of the user profile to the content platform 150. In some implementations, the application 112 may directly upload the generated user profiles to the MPC cluster 130, e.g., rather than sending them to the content platform 150. To ensure the security of the request to generate and return the shares of the user profile, the content platform 150 can send, to the application 112, an upload token $M_{upload}$.

The upload token $M_{upload}$ can have a similar structure as the update token $M_{update}$, but with a different operation (e.g., "update server" instead of "accumulate user profile"). The upload token $M_{upload}$ can also include an additional item for an operation delay. The operation delay can instruct the application 112 to delay calculating and uploading the shares of the user profile while the application 112 accumulates more event data, e.g., more feature vectors. This enables the machine learning model to capture user event data immediately before and after some critical events, e.g., joining a user group. The operation delay can specify the delay time period. In this example, the digital signature can be generated based on the other seven items in Table 3 and the operation delay using the private key of the content platform. The content platform 150 can encrypt the upload token $M_{upload}$ in a similar manner as the update token $M_{update}$, e.g., PubKeyEnc($M_{upload}$, application_public_key), using the application's public key to protect the upload token $M_{upload}$ during transmission.

The application 112 can receive the upload token $M_{upload}$, decrypt the upload token $M_{upload}$ if it is encrypted, and verify the upload token $M_{upload}$. This verification can be similar to the way in which the update token $M_{update}$ is verified. The application 112 can verify the upload token $M_{upload}$ by (i) verifying the digital signature using a public key of the content platform 150 that corresponds to the private key of the content platform 150 that was used to generate the digital signature and (ii) ensuring that the token creation timestamp is not stale, e.g., the time indicated by the timestamp is within a threshold amount of time of a current time at which verification is taking place. If the upload token $M_{upload}$ is valid, the application 112 can generate the user profile. If any verification fails, the application 112 may ignore the upload request, e.g., by not generating a user profile.

In some implementations, the content platform 150 can request the application 112 to upload a user profile without encoding the upload request in the form of a profile upload token $M_{upload}$. For example, a script originated from the content platform 150 running inside the application 112 may directly transmit the upload request to the application 112 via a script API, where the application 112 relies on W3C origin-based security model and/or HTTPS to protect the upload request from falsification or leaking.

If a determination is made to not generate a user profile, the process 300 can return to operation 302 and wait for additional event data from the content platform 150. If a determination is made to generate a user profile, the application 112 generates the user profile (308).

The application 112 can generate the user profile based on the stored event data, e.g., the data stored in the data structure shown in Table 4. The application 112 can access the appropriate data structure based on a model identifier included in the request, e.g., the Content Platform eTLD+1 domain of item 1 and the model identifier of item 2 of the upload token $M_{upload}$.

The application 112 can compute the user profile by aggregating the n-dimensional feature vectors in the data structure in the study period that have not yet expired. For example, the user profile may be the average of the n-dimensional feature vectors in the data structure in the study period that have not yet expired. The result is an n-dimensional feature vector representing the user in the profile space. Optionally, the application 112 may normalize the n-dimensional feature vector to unit length, e.g., using L2 normalization. The content platform 150 may specify the optional study period.

In some implementations, decay rates can be used to calculate the user profiles. As there may be many content platforms 150 that use the MPC cluster 130 to train machine learning models and each content platform 150 may have multiple machine learning models, storing user feature vector data may result in significant data storage requirements. Using decay techniques can substantially reduce the amount of data that is stored at each client device 110 for the purposes of generating user profiles for training the machine learning models.

Assume that, for a given machine learning model, there are k feature vectors $\{F_1, F_2, \ldots F_k\}$, each of which is a n-dimensional vector and their corresponding age (record_age_in_seconds$_i$). The application 112 can compute the user profile using Relationship 1 below:

$$\sum_{i=1}^{k} \left( e^{-\frac{record\_age\_in\_seconds_i}{decay\_rate\_in\_seconds}} \times F_i \right) \quad \text{Relationship 1}$$

In this relationship, the parameter record_age_in_seconds$_i$ is the amount of time in seconds that the profile record has been stored at the client device 110 and the parameter decay_rate_in_seconds is the decay rate of the profile record in seconds (e.g., received in item 6 of the update token $M_{update}$). In this way, more recent feature vectors carry more weight. This also enables the application 112 to avoid storing feature vectors and only store profile records with constant storage. The application 112 only has to store an n-dimensional vector P and a timestamp user_profile_time for each model identifier, rather than multiple individual feature vectors for each model identifier. This substantially reduces the amount of data that has to be stored at the client device 110, which many client devices typically have limited data storage capacity.

To initialize the n-dimensional vector user profile P and timestamp, the application can set the vector P to a vector of n dimensions where the value of each dimension is zero and set the user_profile_time to epoch. To update the user profile P with a new feature vector $F_x$ at any time, the application 112 can use Relationship 2 below:

$$P = e^{-\frac{current\_time - user\_profile\_time}{decay\_rate\_in\_seconds}} \times P + F_x \quad \text{Relationship 2}$$

The application 112 can also update the user profile time to the current time (current_time) when updating the user profile with Relationship 2. Note that operations 304 and 308 are omitted if the application 112 calculates user profiles with the above decay rate algorithm.

The application 112 generates shares of the user profile (310). The application 112 can use a pseudorandom function to split the user profile $P_i$ (e.g., the n-dimensional vector P) into shares. That is, the application 112 can use pseudorandom function $PRF(P_i)$ to generate two shares $\{[P_{i,1}],[P_{i,2}]\}$ of the user profile $P_i$. The exact splitting can depend on the secret sharing algorithm and crypto library used by the application 112. In some implementations, the application uses Shamir's secret sharing scheme. If shares of one or more labels are being provided, the application 112 can also generate shares of the labels as well.

The application 112 encrypts the shares $\{[P_{i,1}],[P_{i,2}]\}$ of the user profile $P_i$ (312). For example, as described above, the application 112 can generate composite messages that include shares of the user profile and the label and encrypt the composite messages to obtain encryption results PubKeyEncrypt($[P_{i,1}]\|[label_{i,1}]$, MPC$_1$) and PubKeyEncrypt ($[P_{i,2}]\|[label_{i,2}]$, MPC$_2$). Encrypting the shares using encryption keys of the MPC cluster 130 prevents the content platform 150 from being able to access the user profiles in plaintext. The application 112 transmits the encrypted shares to the content platform (314). Note that operation 314 is omitted if the application 112 transmits the secret shares directly to computing systems MPC$_1$ and MPC$_2$.

Example Process for Generating and Using Machine Learning Models

FIG. 4 is a flow diagram that illustrates an example process 400 for generating a machine learning model. Operations of the process 400 can be implemented, for example, by the MPC cluster 130 of FIG. 1. Operations of the process 400 can also be implemented as instructions stored on one or more computer readable media which may be non-transitory, and execution of the instructions by one or more data processing apparatus can cause the one or more data processing apparatus to perform the operations of the process 400.

The MPC cluster 130 obtains shares of user profiles (402). A content platform 150 can request that the MPC cluster 130 train a machine learning model by transmitting shares of user profiles to the MPC cluster 130. The content platform 150 can access the encrypted shares received from the client devices 110 for the machine learning model over a given time period and upload those shares to the MPC cluster 130.

For example, the content platform 150 can transmit, to computing system MPC$_1$, the encrypted first share of the user profile and the encrypted first share of its label (e.g., PubKeyEncrypt($[P_{i,1}]\|[label_{i,1}]$, MPC$_1$) for each user profile $P_i$. Similarly, the content platform 150 can transmit, to computing system MPC$_2$, the encrypted second share of the user profile and the encrypted second share of its label (e.g., PubKeyEncrypt($[P_{i,2}]\|[label_{i,2}]$) for each user profile $P_i$.

In some implementations where the application 112 directly sends secret shares of user profiles to the MPC cluster 130, the content platform 150 can request that the MPC cluster 130 train a machine learning model by transmitting a training request to the MPC cluster 130.

The computing systems MPC$_1$ and MPC$_2$ create random projection planes (404). The computing systems MPC$_1$ and MPC$_2$ can collaboratively create m random projection planes U=$\{U_1, U_2, \ldots, U_m\}$. These random projection planes should remain as secret shares between the two computing systems MPC$_1$ and MPC$_2$. In some implementations, the computing systems MPC$_1$ and MPC$_2$ create the random projection planes and maintain their secrecy using the Diffie-Hellman key exchange technique.

As described in more detail below, the computing systems MPC$_1$ and MPC$_2$ will project their shares of each user profile onto each random projection plane and determine, for each random projection plane, whether the share of the user profile is on one side of the random projection plane. Each computing system MPC$_1$ and MPC$_2$ can then build a bit vector in secret shares from secret shares of the user profile based on the result for each random projection. Partial knowledge of the bit vector for a user, e.g., whether or not the user profile Pi is on one side of the projection plane $U_k$ allows either computing system MPC$_1$ or MPC$_2$ to gain some knowledge about the distribution of $P_i$, which is incremental to the prior knowledge that the user profile $P_i$ has unit length. To prevent the computing systems MPC$_1$ and MPC$_2$ gaining access to this information (e.g., in implementations in which this is required or preferred for user privacy and/or data security), in some implementations, the random projection planes are in secret shares, therefore neither computing system MPC$_1$ nor MPC$_2$ can access the random projection planes in cleartext. In other implementations, a random bit flipping pattern can be applied over random projection results using secret share algorithms, as described in optional operations 406-408.

To demonstrate how to flip bits via secret shares, assume that there are two secrets x and y whose values are either zero or one with equal probability. An equality operation [x]==[y] will flip the bit of x if y==0 and will keep the bit of x if y==1. In this example, the operation will randomly flip the bit x with 50% probability. This operation can require remote procedure calls (RPCs) between the two computing systems MPC$_1$ and MPC$_2$ and the number of rounds depends on the data size and the secret share algorithm of choice.

Each computing system MPC$_1$ and MPC$_2$ create a secret m-dimensional vector (406). The computing system MPC$_1$ can create a secret m-dimension vector $\{S_1, S_2, \ldots S_m\}$, where each element $S_i$ has a value of either zero or one with equal probability. The computing system MPC$_1$ splits its m-dimensional vector into two shares, a first share $\{[S_{1,1}], [S_{2,1}], \ldots [S_{m,1}]\}$ and a second share $\{[S_{1,2}], [S_{2,2}], \ldots [S_{m,2}]\}$. The computing system MPC$_1$ can keep the first share secret and provide the second share to computing system MPC$_2$. The computing system MPC$_1$ can then discard the m-dimensional vector $\{S_1, S_2, \ldots S_m\}$.

The computing system $MPC_2$ can create a secret m-dimension vector $\{T_1, T_2, \ldots T_m\}$, where each element $T_i$ has a value of either zero or one. The computing system $MPC_2$ splits its m-dimensional vector into two shares, a first share $\{[T_{1,1}], [T_{2,1}], \ldots [T_{m,1}]\}$ and a second share $\{[T_{1,2}], [T_{2,2}], \ldots [T_{m,2}]\}$. The computing system $MPC_2$ can keep the first share secret and provide the second share to computing system $MPC_1$. The computing system $MPC_2$ can then discard the m-dimensional vector $\{T_1, T_2, \ldots T_m\}$.

The two computing systems $MPC_1$ and $MPC_2$ use secure MPC techniques to calculate shares of a bit flipping pattern (408). The computing systems $MPC_1$ and $MPC_2$ can use a secret share MPC equality test with multiple roundtrips between the computing systems $MPC_1$ and $MPC_2$ to compute shares of the bit flipping pattern. The bit flipping pattern can be based on the operation $[x]==[y]$ described above. That is, the bit flipping pattern can be $\{S_1==T_1, S_2==T_2, \ldots S_m==T_m\}$. Let each $ST_i=(S_i==T_i)$. Each $ST_i$ has a value of either zero or one. After the MPC operation is completed, computing system $MPC_1$ has a first share $\{[ST_{1,1}], [ST_{2,1}], \ldots [ST_{m,1}]\}$ of the bit flipping pattern and computing system $MPC_2$ has a second share $\{[ST_{1,2}], [ST_{2,2}], \ldots [ST_{m,2}]\}$ of the bit flipping pattern. The shares of each $ST_i$ enable the two computing systems $MPC_1$ and $MPC_2$ to flip the bits in bit vectors in a way that is opaque to either one of the two computing systems $MPC_1$ and $MPC_2$.

Each computing system $MPC_1$ and $MPC_2$ projects its shares of each user profile onto each random projection plane (410). That is, for each user profile that the computing system $MPC_1$ received a share, the computing system $MPC_1$ can project the share $[P_{i,1}]$ onto each projection plane $U_j$. Performing this operation for each share of a user profile and for each random projection plane $U_j$ results in a matrix R of z×m dimension, where z is the number of user profiles available and m is the number of random projection planes. Each element $R_{i,j}$ in the matrix R can be determined by computing the dot product between the projection plane $U_j$ and the share $[P_{i,1}]$, e.g., $R_{i,j}=U_j \odot [P_{i,1}]$. The operation $\odot$ denotes the dot product of two vectors of equal length.

If bit flipping is used, computing system $MPC_1$ can modify the values of one or more of the elements $R_{i,j}$ in the matrix using the bit flipping pattern secretly shared between the computing systems $MPC_1$ and $MPC_2$. For each element $R_{i,j}$ in the matrix R, computing system $MPC_1$ can compute, as the value of the element $R_{i,j}$, $[ST_{j,1}]==sign(R_{i,j})$. Thus, the sign of the element $R_{i,j}$ will be flipped if its corresponding bit in the bit $[ST_{j,1}]$ in the bit flipping pattern has a value of zero. This computation can require multiple RPCs to computing system $MPC_2$.

Similarly, for each user profile that the computing system $MPC_2$ received a share, the computing system $MPC_2$ can project the share $[P_{i,2}]$ onto each projection plane $U_j$. Performing this operation for each share of a user profile and for each random projection plane $U_j$ results in a matrix R' of z×m dimension, where z is the number of user profiles available and m is the number of random projection planes. Each element $R_{ij}'$ in the matrix R' can be determined by computing the dot product between the projection plane $U_j$ and the share $[P_{i,2}]$, e.g., $R_{i,j}'=U_j \odot [P_{i,2}]$. The operation $\odot$ denotes the dot product of two vectors of equal length.

If bit flipping is used, computing system $MPC_2$ can modify the values of one or more of the elements $R_{i,j}'$ in the matrix using the bit flipping pattern secretly shared between the computing systems $MPC_1$ and $MPC_2$. For each element $R_{i,j}'$ in the matrix R', computing system $MPC_2$ can compute, as the value of the element $R_{i,j}'$, $[ST_{j,2}]==sign(R_{i,j}')$. Thus, the sign of the element $R_{i,j}'$ will be flipped if its corresponding bit in the bit $ST_j$ in the bit flipping pattern has a value of zero. This computation can require multiple RPCs to computing system $MPC_1$.

The computing systems $MPC_1$ and $MPC_2$ reconstruct bit vectors (412). The computing systems $MPC_1$ and $MPC_2$ can reconstruct the bit vectors for the user profiles based on the matrices R and R', which have exactly the same size. For example, computing system $MPC_1$ can send a portion of the columns of matrix R to computing system $MPC_2$ and computing system $MPC_2$ can send the remaining portion of the columns of matrix R' to $MPC_1$. In a particular example, computing system $MPC_1$ can send the first half of the columns of matrix R to computing system $MPC_2$ and computing system $MPC_2$ can send the second half of the columns of matrix R' to $MPC_1$. Although columns are used in this example for horizontal reconstruction and are preferred to protect user privacy, rows can be used in other examples for vertical reconstruction.

In this example, computing system $MPC_2$ can combine the first half of the columns of matrix R' with the first half of the columns of matrix R received from computing system $MPC_1$ to reconstruct the first half (i.e., m/2 dimension) of bit vectors in cleartext. Similarly, computing system $MPC_1$ can combine the second half of the columns of matrix R with the second half of the columns of matrix R' received from computing system $MPC_2$ to reconstruct the second half (i.e. m/2 dimension) of bit vectors in cleartext. Conceptually, the computing systems $MPC_1$ and $MPC_2$ have now combined corresponding shares in two matrixes R and R' to reconstruct bit matrix B in plaintext. This bit matrix B would include the bit vectors of the projection results (projected onto each projection plane) for each user profile for which shares were received from the content platform 150 for the machine learning model. Each one of the two servers in the MPC cluster 130 owns half of the bit matrix B in plaintext.

However, if bit flipping is used, the computing systems $MPC_1$ and $MPC_2$ have flipped bits of elements in the matrices R and R' in a random pattern fixed for the machine learning model. This random bit flipping pattern is opaque to either of the two computing systems $MPC_1$ and $MPC_2$ such that neither computing system $MPC_1$ nor $MPC_2$ can infer the original user profiles from the bit vectors of the project results. The crypto design further prevents $MPC_1$ or $MPC_2$ from inferring the original user profiles by horizontally partitioning the bit vectors, i.e. computing system $MPC_1$ holds the second half of bit vectors of the projection results in plaintext and computing system $MPC_2$ holds the first half of bit vectors of the projection results in plaintext.

The computing systems $MPC_1$ and $MPC_2$ generate machine learning models (414). The computing system $MPC_1$ can generate a k-NN model using the second half of the bit vectors. Similarly, computing system $MPC_2$ can generate a k-NN model using the first half of the bit vectors. Generating the models using bit flipping and horizontal partitioning of the matrices applies the defense-in-depth principle to protect the secrecy of the user profiles used to generate the models.

In general, each k-NN model represents cosine similarities (or distances) between the user profiles of a set of users. The k-NN model generated by computing system $MPC_1$ represents the similarity between the second half of the bit vectors and the k-NN model generated by computing system $MPC_2$ represents the similarity between the first half of the bit vectors. For example, each k-NN model can define the cosine similarity between its half of the bit vectors.

The two k-NN models generated by the computing systems $MPC_1$ and $MPC_2$ can be referred to as a k-NN model, which has a unique model identifier as described above. The computing systems $MPC_1$ and $MPC_2$ can store their models and shares of the labels for each user profile used to generate the models. The content platform 150 can then query the models to make inferences for user groups for a user.

Example Process for Using Machine Learning Model to Infer User Groups

FIG. 5 is a flow diagram that illustrates an example process 500 for adding a user to user groups using machine learning models. Operations of the process 500 can be implemented, for example, by the MPC cluster 130 and the client device 110 of FIG. 1, e.g., the application 112 running on the client device 110. Operations of the process 500 can also be implemented as instructions stored on one or more computer readable media which may be non-transitory, and execution of the instructions by one or more data processing apparatus can cause the one or more data processing apparatus to perform the operations of the process 500.

The MPC cluster 130 receives an inference request for a given user profile (502). An application 112 running on a user's client device 110 can transmit the inference request to the MPC cluster 130, e.g., in response to a request from a content platform 150. For example, the content platform 150 can transmit, to the application 112, an upload token $M_{infer}$ to request that the application 112 submit the inference request to the MPC cluster 130. The inference request can be to query whether the user should be added to any number of user groups.

The inference request token $M_{infer}$ can include shares of the given user profile of the user, the model identifier for the machine learning model (e.g., k-NN model) and the owner domain to be used for the inference, a number k of nearest neighbors of the given user profile to be used for the inference, additional signals (e.g., contextual or digital component signals), the aggregation function to be used for the inference and any aggregation function parameters to be used for the inference, and the signature over all the above information created by the owner domain using an owner domain confidential privacy key.

As described above, to prevent leaking the given user profile $P_i$ in plaintext form to either computing system $MPC_1$ or $MPC_2$, and thereby preserve user privacy, the application 112 can split the given user profile $P_i$ into two shares $[P_{i,1}]$ and $[P_{i,2}]$ for $MPC_1$ and $MPC_2$, respectively. The application 112 can then send a single inference request to computing system $MPC_1$ with the first share $[P_{i,1}]$ of the given user profile and an encrypted version of the second share, e.g., $PubKeyEncrypt([P_{i,2}], MPC_2)$ of the given user profile. The inference request may also include the inference request token $M_{infer}$ so that the MPC cluster 130 can authenticate the inference request. By sending an inference request that includes the first share and the encrypted second share, the number of outgoing requests sent by the application 112 is reduced, resulting in computational, bandwidth, and battery savings at the client device 110.

In other implementations, the application 112 can send the first share $[P_{i,1}]$ of the given user profile to computing system $MPC_1$ and the second share $[P_{i,2}]$ of the given user profile to computing system $MPC_2$. By sending the second share $[P_{i,2}]$ of the given user profile to computing system $MPC_2$ without going through computing system $MPC_1$, the second share does not need to be encrypted to prevent computing system $MPC_1$ from accessing the second share $[P_{i,2}]$ of the given user profile.

Each computing system $MPC_1$ and $MPC_2$ identifies the k nearest neighbors to the given user profile in secret share representation (504). The computing system $MPC_1$ can compute its half of a bit vector of the given user profile using the first share $[P_{i,1}]$ of the given user profile. To generate the bit vector, computing system $MPC_1$ can use operations 410 and 412 of the process 400 of FIG. 4. That is, computing system $MPC_1$ can use the random projection vectors generated for the k-NN model to project the share $[P_{i,1}]$ of the given user profile and create a secret share of a bit vector for the given user profile. If bit flipping was used to generate the k-NN model, the computing system $MPC_1$ can then use the first share $\{[ST_{1,1}], [ST_{2,1}], \ldots [ST_{m,1}]\}$ of the bit flipping pattern that was used to generate the k-NN model to modify the elements of the secret share of a bit vector for the given user profile.

Similarly, the computing system $MPC_1$ can provide, to computing system $MPC_2$, the encrypted second share $PubKeyEncrypt([P_{i,2}], MPC_2)$ of the given user profile. The computing system $MPC_2$ can decrypt the second share $[P_{i,2}]$ of the given user profile using its private key and compute its half of the bit vector for the given user profile using the second share $[P_{i,2}]$ of the given user profile. That is, computing system $MPC_2$ can use the random projection vectors generated for the k-NN model to project the share $[P_{i,2}]$ of the given user profile and create a bit vector for the given user profile. If bit flipping was used to generate the k-NN model, the computing system $MPC_2$ can then use the second share $\{[ST_{1,2}], [ST_{2,2}], \ldots [ST_{m,2}]\}$ of the bit flipping pattern that was used to generate the k-NN model to modify the elements of the bit vector for the given user profile. The computing systems $MPC_1$ and $MPC_2$ then reconstruct the bit vector with horizontal partition, as described in operation 412 in FIG. 4. After the completion of reconstruction, computing system $MPC_1$ has the first half of the overall bit vector for the given user profile and computing system $MPC_2$ has the second half of the overall bit vector for the given user profile.

Each computing system $MPC_1$ and $MPC_2$ uses its half of the bit vector for the given user profile and its k-NN model to identify the k' nearest neighbor user profiles, where $k'=a \times k$, where a is empirically determined based on actual production data and statistical analysis. For example a=3 or another appropriate number. The computing system $MPC_1$ can compute a Hamming distance between the first half of the overall bit vector and the bit vector for each user profile of the k-NN model. The computing system $MPC_1$ then identifies the k' nearest neighbors based on the computed Hamming distances, e.g., the k' user profiles having the lowest Hamming distances. In other words, the computing system $MPC_1$ identifies a set of nearest neighbor user profiles based on a share of a given user profile and a k-nearest neighbor model trained using a plurality of user profiles. An example result in tabular form is shown in Table 5 below.

TABLE 5

| Row ID | Hamming Distance (in plaintext) | Shares of User Profile | Shares of Label |
|---|---|---|---|
| i | $d_{i,1}$ | $[P_{i,1}]$ | $[label_{i,1}]$ |
| . . . | . . . | . . . | . . . |

In Table 5, each row is for a particular nearest neighbor user profile and includes the Hamming distance between the first half of the bit vector for each user profile and the bit vector for given user profile computed by computing system $MPC_1$. The row for a particular nearest neighbor user profile also includes the first share of that user profile and the first share of the label associated with that user profile.

Similarly, the computing system $MPC_2$ can compute a Hamming distance between the second half of the overall bit vector and the bit vector for each user profile of the k-NN model. The computing system $MPC_2$ then identifies the k' nearest neighbors based on the computed Hamming distances, e.g., the k' user profiles having the lowest Hamming distances. An example result in tabular form is shown in Table 6 below.

TABLE 6

| Row ID | Hamming Distance (in plaintext) | Shares of User Profile | Shares of Label |
|--------|-------------------------------|----------------------|----------------|
| j      | $d_{j,2}$                     | $[P_{j,2}]$          | $[label_{j,2}]$ |
| ...    | ...                           | ...                  | ...            |

In Table 6, each row is for a particular nearest neighbor user profile and includes the Hamming distance between that user profile and the given user profile computed by computing system $MPC_2$. The row for a particular nearest neighbor user profile also includes the second share of that user profile and the second share of the label associated with that user profile.

The computing systems $MPC_1$ and $MPC_2$ can exchange the list of row identifiers (row ID) and Hamming distance pairs with each other. Thereafter, each computing system $MPC_1$ and $MPC_2$ can independently select k nearest neighbors with the same algorithm and input data. For example, computing system $MPC_1$ can find row identifiers common to partial query results from both computing systems $MPC_1$ and $MPC_2$. For each i in the common row identifiers, computing system $MPC_1$ calculates combined Hamming distance $d_i$ from the two partial Hamming distances, e.g., $d_i=d_{i,1}+d_{i,2}$. The computing system $MPC_1$ can then order the common row identifiers based on the combined Hamming distance $d_i$ and select the k nearest neighbors. The row identifiers for the k nearest neighbors can be represented as ID=$\{id_1, \ldots id_k\}$. It can be proven that if a is sufficiently large, the k nearest neighbors determined in the above algorithm are the true k nearest neighbors with high probability. However, larger value for a leads to high computation cost. In some implementations, computing systems $MPC_1$ and $MPC_2$ engage in Private Set Intersection (PSI) algorithms to determine row identifiers common to partial query results from both computing systems $MPC_1$ and $MPC_2$. Furthermore, in some implementations, $MPC_1$ and $MPC_2$ engage in enhanced Private Set Intersection (PSI) algorithms to calculate $d_i=d_{i,1}+d_{i,2}$ for row identifiers common to partial query results from both computer systems $MPC_1$ and $MPC_2$, and reveal nothing to either $MPC_1$ or $MPC_2$ but the top k nearest neighbors determined by $d_i$.

A determination is made whether to add the user to a user group (506). This determination can be made based on the k nearest neighbor user profiles and their associated labels. The determination is also based on the aggregation function used and any aggregation parameters for that aggregation function. The aggregation functions can be chosen based on the nature of the machine learning problem, for example, binary classification, regression (e.g., using arithmetic mean or root mean square), multiclass classification, and weighted k-NN. Each way of determining whether to add a user to a user group can include different interactions between the MPC cluster 130 and the application 112 running on the client 110, as described in more detail below.

If a determination is made to not add the user to the user group, the application 112 may not add the user to the user group (508). If a determination is made to add the user to the user group, the application 112 can add the user to the user group, e.g., by updating the user group list stored at the client device 110 to include the user group identifier of the user group (510).

Example Binary Classification Inference Techniques

For binary classification, the inference request can include, as aggregation function parameters, a threshold, $L_{true}$, and $L_{false}$. The label values are Boolean type, i.e., either true or false. The threshold parameter can represent a threshold percentage of k nearest neighbor user profiles that must have a label of true value in order for the user to be added to the user group $L_{true}$. Otherwise the user will be added to user group $L_{false}$. In one approach, the MPC cluster 130 could instruct the application 112 to add the user to the user group $L_{true}$ ($L_{false}$ otherwise) if the number of nearest neighbor user profiles that has a label value that is true is greater than a product of the threshold and k. However, computing system $MPC_1$ would learn the inference result, e.g., the user group that the user should join.

To preserve user privacy, the inference request can include the threshold in plaintext, a first share $[L_{true,1}]$ and $[L_{false,1}]$ for computing system $MPC_1$, and an encrypted second share PubKeyEncrypt($[L_{true,2}]$||$[L_{false,2}]$||application_public_key, $MPC_2$) for computing system $MPC_2$. In this example, the application 112 can generate a composite message from $[L_{true,2}]$, $[L_{false,2}]$ and the public key of the application 112, as denoted by the symbols ||, and encrypt this composite message using a public key of computing system $MPC_2$. The inference response from computing system $MPC_1$ to the application 112 can include a first share of the inference result $[L_{result,1}]$ determined by computing system $MPC_1$ and a second share of the inference result $[L_{result,2}]$ determined by computing system $MPC_2$.

To prevent the second share from being accessed by computing system $MPC_1$ and therefore enabling computing system $MPC_1$ to obtain the inference result in plaintext, computing system $MPC_2$ can send an encrypted (and optionally digitally signed) version of the second share of the inference result $[L_{result,2}]$, e.g., PubKeySign(PubKeyEncrypt($[L_{result,2}]$, application_public_key), $MPC_2$) to computing system $MPC_1$ for inclusion in the inference response sent to the application 112. In this example, the application 112 can verify the digital signature using the public key of computing system $MPC_2$ that corresponds to the private key of computing system $MPC_2$ used to generate the digital signature, and decrypt the second share of the inference result $[L_{result,2}]$ using the private key of the application 112 corresponding to the public key (application_public_key) used to encrypt the second share of the inference result $[L_{result,2}]$.

The application 112 can then reconstruct the inference result $L_{result}$ from the first share $[L_{result,1}]$ and the second share $[L_{result,2}]$. Using the digital signature enables the application 112 to detect falsification of the result from computing system $MPC_2$, e.g., by computing system $MPC_1$. Depending on the level of security desired, what parties operate the computing systems of the MPC cluster 130, and the security model assumed, the digital signature may not be required.

The computing systems $MPC_1$ and $MPC_2$ can use MPC techniques to determine the shares $[L_{result,1}]$ and $[L_{result,2}]$ of the binary classification result. In binary classification, the value of $label_1$ for a user profile is either zero (false) or one (true). Assuming that the selected k nearest neighbors are identified by identifiers $\{id_1, \ldots id_k\}$, the computing systems $MPC_1$ and $MPC_2$ can calculate a sum of the labels (sum_of_labels) for the k nearest neighbor user profiles, where the sum is represented by Relationship 3 below:

$$\text{sum\_of\_labels} = \Sigma_{i \in \{id1, \ldots idk\}} \text{label}_i \qquad \text{Relationship 3}$$

To determine the sum, computing system $MPC_1$ sends ID (i.e., $\{id_1, \ldots id_k\}$) to computing system $MPC_2$. The computing system $MPC_2$ can verify that the number of row identifiers in ID is greater than a threshold to enforce k-anonymity. The computing system $MPC_2$ can then calculate a second share of the sum of labels [sum_of_labels$_2$] using Relationship 4 below:

$$[\text{sum\_of\_labels}_2] = \Sigma_{i \in \{id1, \ldots idk\}} [\text{label}_{i,2}] \qquad \text{Relationship 4}$$

The computing system $MPC_1$ can also calculate a first share of the sum of labels [sum_of_labels$_1$] using Relationship 5 below:

$$[\text{sum\_of\_labels}_1] = \Sigma_{i \in \{id1, \ldots idk\}} [\text{label}_{i,1}] \qquad \text{Relationship 5}$$

If the sum of the labels sum of labels is confidential information that the computing systems $MPC_1$ and $MPC_2$ should know as little as possible, computing system $MPC_1$ can calculate whether the first share of the sum of labels [sum_of_labels$_1$] is below the threshold, e.g., [below_threshold$_1$]=[sum_of_labels$_1$]<threshold×k. Similarly, computing system $MPC_2$ can calculate whether the second share of the sum of labels [sum_of_labels$_2$] is below the threshold, e.g., [below_threshold$_2$]=[sum_of_labels$_2$] <threshold×k. The computing system $MPC_1$ can proceed to calculate inference result $[L_{result,1}]$ by [below_threshold$_1$]× $[L_{false,1}]$+(1−[below_threshold$_1$])×$[L_{true,1}]$. Similarly, computing system $MPC_2$ can calculate $[L_{result,2}]$ by [below_threshold$_2$]×$[L_{false,2}]$+(1−[below_threshold$_2$])× $[L_{true,2}]$.

If the sum of the labels sum_of_labels is not confidential information, computing systems $MPC_1$ and $MPC_2$ can reconstruct the sum_of_labels from [sum_of_labels$_1$] and [sum_of_labels$_2$]. The computing systems $MPC_1$ and $MPC_2$ can then set the parameter below_threshold to sum_of_labels<threshold×k, e.g., a value of one if it is below the threshold or a value of zero if not below the threshold.

After computing the parameter below_threshold, the computing systems $MPC_1$ and $MPC_2$ can proceed to determine the inference result $L_{result}$. For example, computing system $MPC_2$ can set $[L_{result,2}]$ to either $[L_{true,2}]$ or $[L_{false,2}]$ according to the value of below_threshold. For example, computing system $MPC_2$ can set $[L_{result,2}]$ to $[L_{true,2}]$ if the sum of labels is not below the threshold or to $[L_{false,2}]$ if the sum of labels is below the threshold. The computing system $MPC_2$ can then return an encrypted second share of the inference result (PubKeyEncrypt($L_{result,2}$), application_public_key)) or a digitally signed version of this result to computing system $MPC_1$.

Similarly, computing system $MPC_1$ can set $[L_{result,1}]$ to either $[L_{true,1}]$ or $[L_{false,1}]$ according to the value of below_threshold. For example, computing system $MPC_1$ can set $[L_{result,1}]$ to $[L_{true,1}]$ if the sum of labels is not below the threshold or to $[L_{false,1}]$ if the sum of labels is below the threshold. The computing system $MPC_1$ can transmit the first share of the inference result $[L_{result,1}]$ and the encrypted second share of the inference result $[L_{result,2}]$ as an inference response to the application 112. The application 112 can then compute the inference result based on the two shares, as described above.

Example Multiclass Classification Inference Techniques

For multiclass classification, the label associated with each user profile can be categorical feature. The content platform 150 can specify a lookup table that maps any possible categorical value to a corresponding user group identifier. The lookup table can be one of the aggregation function parameters included in the inference request.

Within the k nearest neighbors found, the MPC cluster 130 finds the most frequent label value. The MPC cluster 130 can then find, in the lookup table, the user group identifier corresponding to the most frequent label value and request that the application 112 add the user to the user group corresponding to the user group identifier, e.g., by adding the user group identifier to the user group list stored at the client device 110.

Similar to binary classification, it may be preferable to hide the inference result $L_{result}$ from the computing systems $MPC_1$ and $MPC_2$. To do so, the application 112 or the content platform 150 can create two lookup tables that each maps categorical values to a respective share of the inference result $L_{result}$. For example, the application can create a first lookup table that maps the categorical values to a first share $[L_{result1}]$ and a second lookup table that maps the categorical values to a second share $[L_{result2}]$. The inference request from the application to computing system $MPC_1$ can include the first lookup table in plaintext for computing system $MPC_1$ and an encrypted version of the second lookup table for computing system $MPC_2$. The second lookup table can be encrypted using a public key of computing system $MPC_2$. For example, a composite message that includes the second lookup table and a public key of the application can be encrypted using the public key of the computing system $MPC_2$, e.g., PubKeyEncrypt (lookuptable2∥application_public_key, $MPC_2$).

The inference response sent by computing system $MPC_1$ can include the first share $[L_{result1}]$ of the inference result generated by the computing system $MPC_1$. Similar to binary classification, to prevent the second share from being accessed by computing system $MPC_1$ and therefore enabling computing system $MPC_1$ to obtain the inference result in plaintext, computing system $MPC_2$ can send an encrypted (and optionally digitally signed) version of the second share of the inference result $[L_{result,2}]$, e.g., PubKeySign(PubKeyEncrypt($[L_{result,2}]$, application_public_key), $MPC_2$) to computing system $MPC_1$ for inclusion in the inference result sent to the application 112. The application 112 can reconstruct the inference result $L_{result}$ from $[L_{result1}]$ and $[L_{result2}]$.

Assume there are w valid labels $\{l_1, l_2, \ldots l_w\}$ for a multiclass classification problem. To determine the shares $[L_{result1}]$ and $[L_{result2}]$ of the inference result $L_{result}$ in multiclass classification, computing system $MPC_1$ sends ID (i.e., $\{id_1, \ldots id_k\}$) to computing system $MPC_2$. The computing system $MPC_2$ can verify that the number of row identifiers in ID is greater than a threshold to enforce k-anonymity. In general, the k in k-NN may be significantly larger than the k in k-anonymity. The computing system MPC$_2$ can then calculate a second frequency share [frequency$_{j,2}$] of the j-th label [l$_{j,2}$] which is defined using Relationship 6 below.

$$[\text{frequency}_{j,2}] = \Sigma_{i \in \{id_1, \ldots id_k\}} [\text{label}_{i,2}] == l_j) \quad \text{Relationship 6}$$

Similarly, computing system MPC$_1$ calculates a first frequency share [frequency$_{j,1}$] of the j-th label [l$_{j,1}$] which is defined using Relationship 7 below.

$$[\text{frequency}_{j,1}] = \Sigma_{i \in \{id_1, \ldots id_k\}} [\text{label}_{i,1}] == l_j) \quad \text{Relationship 7}$$

Assuming that the frequency of a label (frequency) within the k nearest neighbors is not sensitive, the computing systems MPC$_1$ and MPC$_2$ can reconstruct frequency$_i$ from the two shares [frequency$_{i,1}$] and [frequency$_{i,2}$] for that label. The computing systems MPC$_1$ and MPC$_2$ can then determine an index parameter (index) where frequency$_{index}$ has the largest value, e.g., index=argmax$_i$(frequency).

The computing system MPC$_2$ can then lookup, in its lookup table, the share [L$_{result,2}$] corresponding to the label having the highest frequency and return PubKeyEncrypt ([L$_{result,2}$], application_public_key) to the computing system MPC$_1$. The computing system MPC$_1$ can similarly lookup, in its lookup table, the share [L$_{result,1}$] corresponding to the label having the highest frequency. The computing system MPC$_1$ can then send, to the application 112, an inference response that includes the two shares (e.g., [L$_{result,1}$] and PubKeyEncrypt([L$_{result,2}$], application_public_key). As described above, the second share can be digitally signed by computing system MPC$_2$ to prevent computing system MPC$_1$ from falsifying the response of computing system MPC$_2$. The application 112 can then compute the inference result based on the two shares, as described above, and add the user to the user group identified by the inference result.

Example Regression Inference Techniques

For regression, the label associated with each user profile P must be numerical. The content platform 150 can specify an ordered list of thresholds, e.g., $(-\infty < t_0 < t_1 < \ldots < t_n < \infty)$, and a list of user group identifiers, e.g., $\{L_0, L_1, \ldots L_n, L_{n+1}\}$. In addition, the content platform 150 can specify an aggregation function, e.g., arithmetic mean or root mean square.

Within the k nearest neighbors found, the MPC cluster 130 calculates the mean (result) of the label values and then looks up the mapping using the result to find the inference result L$_{result}$. For example, the MPC cluster 130 can use Relationship 8 below to identify the label based on the mean of the label values:

If result$\leq t_0$, L$_{result} \leftarrow L_0$;

If result$> t_n$, L$_{result} \leftarrow L_{n+1}$;

If $t_x <$ result$\leq t_{x+1}$, L$_{result} \leftarrow L_{x+1}$ \quad Relationship 8

That is, if the result is less than or equal to threshold t$_0$, the inference result L$_{result}$ is L$_0$. If the result is greater than threshold t$_n$, the inference result L$_{result}$ is L$_{n+1}$. Otherwise, if the result is greater than threshold t$_x$ and less than or equal to threshold t$_{x+1}$, the inference result L$_{result}$ is L$_{x+1}$. The computing system MPC$_1$ then requests that the application 112 add the user to the user group corresponding to the inference result L$_{result}$, e.g., by sending an inference response that includes the inference result L$_{result}$ to the application 112.

Similar to the other classification techniques described above, the inference result L$_{result}$ can be hidden from the computing systems MPC$_1$ and MPC$_2$. To do so, the inference request from the application 112 can include first share of the labels [L$_{i,1}$] for computing system MPC$_1$ and encrypted second shares of the labels [L$_{i,2}$] (e.g., PubKeyEncrypt([L$_{0,2}$] $\ldots$ ||L$_{n+1,2}$||application_public_key, MPC$_2$)) for computing system MPC$_2$.

The inference result sent by computing system MPC$_1$ can include the first share [L$_{result1}$] of the inference result generated by the computing system MPC$_1$. Similar to binary classification, to prevent the second share from being accessed by computing system MPC$_1$ and therefore enabling computing system MPC$_1$ to obtain the inference result in plaintext, computing system MPC$_2$ can send an encrypted (and optionally digitally signed) version of the second share of the inference result [L$_{result,2}$], e.g., PubKeySign(PubKeyEncrypt([L$_{result,2}$], application_public_key), MPC$_2$) to computing system MPC$_1$ for inclusion in the inference result sent to the application 112. The application 112 can reconstruct the inference result L$_{result}$ from [L$_{result,1}$] and [L$_{result,2}$].

When the aggregation function is arithmetic mean, the computing systems MPC$_1$ and MPC$_2$ compute the sum of the labels sum_of_labels, similar to binary classification. If the sum of the labels is not sensitive, the computing systems MPC$_1$ and MPC$_2$ can calculate the two shares [sum_of_labels$_1$] and [sum_of_labels$_2$] and then reconstruct sum_of_labels based on the two shares. The computing systems MPC$_1$ and MPC$_2$ can then compute the average of the labels by dividing the sum of the labels by the quantity of the nearest neighbor labels, e.g., by k.

The computing system MPC1 can then compare the average to the thresholds using Relationship 8 to identify the first share of the label corresponding to the average and set the first share [L$_{result,1}$] to the first share of the identified label. Similarly, the computing system MPC$_2$ can compare the average to the thresholds using Relationship 8 to identify the second share of the label corresponding to the average and set the second share [L$_{result,2}$] to the second share of the identified label. The computing system MPC$_2$ can encrypt the second share [L$_{result,2}$] using the public key of the application 112, e.g., PubKeyEncrypt ([L$_{result,2}$], application_public_key) and send the encrypted second share to computing system MPC$_1$. The computing system MPC$_1$ can provide the first share and the encrypted second share (which can optionally be digitally signed as described above) to the application 112. The application 112 can then add the user to the user group identified by the label (e.g., user group identifier) L$_{result}$.

If the sum of the labels is sensitive, the computing systems MPC$_1$ and MPC$_2$ may not be able to construct sum_of_labels in plaintext. Instead, computing system MPC$_1$ can calculate a mask [mask$_{i,1}$]=[sum_of_labels$_1$]>t$_i \times$k for $\forall i \in [0,n]$. This computation can require multiple roundtrips between the computing systems MPC$_1$ and MPC$_2$. Next, computing system MPC$_1$ can calculate [acc$_{i,1}$]=(1==$\Sigma_{j=0}^{i}$[mask$_{j,1}$]) and computing system MPC$_2$ can calculate [acc$_{i,2}$]=(1==$\Sigma_{j=0}^{i}$[mask$_{j,2}$]). The equality test in this operation can require multiple roundtrips between the computing systems MPC$_1$ and MPC$_2$.

In addition, computing system MPC$_1$ can calculate [use_default$_1$]=(0==$\Sigma_{j=0}^{n}$[mask$_{j,1}$]) and computing system MPC$_2$ can calculate [use_default$_2$]=(0==$\Sigma_{j=0}^{n}$[mask$_{j,2}$]). The MPC cluster 130 would then return L$_i$ if and only if acc$_i$==1, for $\forall i \in [0,n]$ and would return L$_{n+1}$ if use_default==1. This condition can be represented in Relationship 9 below.

$$\text{result} = \text{use\_default} \times L_{n+1} + \Sigma_{i=0}^{n} \text{acc}_i \times L_i \quad \text{Relationship 9}$$

The corresponding cryptographic implementation can be represented by Relationships 10 and 11 below.

$$[L_{result,1}] = [\text{use\_default}_1] \times L_{n+1} + \Sigma_{i=0}^n ([\text{acc}_{i,1}] \times L_i) \quad \text{Relationship 10}$$

$$[L_{result,2}] = [\text{use\_default}_2] \times L_{n+1} + \Sigma_{i=0}^n ([\text{acc}_{i,2}] \times L_i) \quad \text{Relationship 11}$$

These computations do not require any roundtrip computations between the computing systems $MPC_1$ and $MPC_2$ if $L_i$ are in cleartext, and involve one roundtrip computation if $L_i$ are in secret shares. The computing system $MPC_1$ can provide the two shares of the result (e.g., $[L_{result,1}]$ and $[L_{result,2}]$) to the application 112, with the second share encrypted and optionally digitally signed by computing system $MPC_2$ as described above. In this way, the application 112 can determine the inference result $L_{result}$ without the computing systems $MPC_1$ or $MPC_2$ learning anything about the immediate or final result.

For root mean square, computing system $MPC_1$ sends ID (i.e., $\{id_1, \ldots id_k\}$) to computing system $MPC_2$. The computing system $MPC_2$ can verify that the number of row identifiers in ID is greater than a threshold to enforce k-anonymity. The computing system $MPC_2$ can calculate a second share of a sum_of_square_labels parameter (e.g., the sum of the squares of the label values) using Relationship 12 below.

$$[\text{sum\_of\_square\_labels}_2] = \Sigma_{i \in \{id_1, \ldots id_k\}} [\text{label}_{i,2}]^2 \quad \text{Relationship 12}$$

Similarly, computing system $MPC_1$ can calculate a first share of the sum_of_square_labels parameter using Relationship 13 below.

$$[\text{sum\_of\_square\_labels}_1] = \Sigma_{i \in \{id_1, \ldots id_k\}} [\text{label}_{i,1}]^2 \quad \text{Relationship 13}$$

Assuming that the sum_of_square_labels parameter is not sensitive, the computing systems $MPC_1$ and $MPC_2$ can reconstruct the sum_of_square_labels parameter from the two shares [sum_of_square_labels$_1$] and [sum_of_square_labels$_2$]. The computing systems $MPC_1$ and $MPC_2$ can compute the root mean square of the labels by dividing the sum_of_squares_labels by the quantity of the nearest neighbor labels, e.g., by k, then calculating the square root.

Regardless of whether the average is calculated via arithmetic mean or root mean square, the computing system $MPC_1$ can then compare the average to the thresholds using Relationship 8 to identify the label corresponding to the average and set the first share $[L_{result,1}]$ to the identified label. Similarly, the computing system $MPC_2$ can compare the average to the thresholds using Relationship 8 to identify the label (or secret share of the label) corresponding to the average and set the second share $[L_{result,2}]$ to the identified label (or the secret share of the identified label). The computing system $MPC_2$ can encrypt the second share $[L_{result,2}]$ using the public key of the application 112, e.g., PubKeyEncrypt ($[L_{result,2}]$, application_public_key) and send the encrypted second share to computing system $MPC_1$. The computing system $MPC_1$ can provide the first share and the encrypted second share (which can optionally be digitally signed as described above) to the application 112 as the inference result. The application 112 can then add the user to the user group identified by the label (e.g., user group identifier) of the $L_{result}$. If the sum_of_square labels parameter is sensitive, the computing systems $MPC_1$ and $MPC_2$ can perform a similar cryptographic protocol as used in the arithmetic mean example to compute the shares of the inference result.

In the above techniques to infer the result of classification and regressions problems, all k nearest neighbors have equal influence, e.g., equal weight, over the final inference result. For many classification and regression problems, model quality can be improved if each of the k neighbors is assigned a weight that monotonically decreases when the Hamming distance between the neighbor and the query parameter $P_i$ increases. A common kernel function with this property is Epanechnikov (parabolic) kernel function. Both the Hamming distance and the weight can be calculated in plaintext.

Sparse Feature Vector User Profiles

When features of electronic resources are included in user profiles and used to generate the machine learning models, the resulting feature vectors can include high cardinality categorical features, such as domains, URLs, and IP addresses. These feature vectors are sparse, with most of the elements having a value of zero. The application 112 could split the feature vectors into two or more dense feature vectors, but the machine learning platform would consume too much client device upload bandwidth to be practical. To prevent this problem, the systems and techniques described above can be adapted to better handle sparse feature vectors.

When providing feature vectors for events to the client device, computer-readable code (e.g., scripts) of a content platform 150 that is included in an electronic resource can invoke an application (e.g., browser) API to specify the feature vector for the event. This code, or content platform 150, can determine whether (some part of) the feature vector is dense or sparse. If the feature vector (or some part of it) is dense, the code can pass in a vector of numerical values as the API parameter. If the feature vector (or some part of it) is sparse, the code can pass in a map, e.g., indexed key/value pairs for those feature elements with non-zero feature values, where the keys are the names or indices of such feature elements. If the feature vector (or some part of it) is sparse, and the non-zero feature values are always the same value, e.g., 1, the code can pass in a set, whose elements are the names or indices of such feature elements.

When aggregating feature vectors to generate a user profile, the application 112 can handle dense and sparse feature vectors differently. The user profile (or some part of it) calculated from dense vectors remains to be a dense vector. The user profile (or some part of it) calculated from maps remains to be a map, until the fill rate is sufficiently high that map does not save storage cost anymore. At that point, the application 112 will convert the sparse vector representation into dense vector representation.

In some implementations, the application 112 can classify some of the feature vectors, or some parts of the feature vectors as sparse feature vectors and some as dense feature vectors. The application 112 can then handle each type of feature vector differently in generating the user profile and/or the shares of the user profile.

The user profile (or some part of it) calculated from sets can be a map, if the aggregation function is sum. For example, each feature vector can have a categorical feature "domain visited". The aggregation function, i.e. sum, will calculate the number of times that the user visited the publisher domain. The user profile (or some part of it) calculated from sets can remain to be a set, if the aggregation function is logical OR. For example, each feature vector can have a categorical feature "domain visited". The aggregation function, i.e. logical OR, will calculate all publisher domains that the user visited, regardless of the frequency of visits.

To send user profiles to the MPC cluster 130 for ML training and prediction, the application 112 may split the dense part of user profiles with any standard crypto libraries that support secret shares. To split the sparse part of user profiles without significantly increasing the client device upload bandwidth and computation cost, a Function Secret Sharing (FSS) technique can be used. In this example, the content platform 150 assigns a unique index to each possible element in the sparse part of the user profile, starting with 1 sequentially. Assume that the valid range of the indices are in the range of [1,N] inclusively.

For the i-th element with non-zero value $P_i$ in a user profile calculated by the application, $1 \leq i \leq N$, the application 112 can create two Pseudo-Random Functions (PRF) $g_i$ and $h_i$ with the following properties:

$$g_i(j)+h_i(j)=0 \text{ for any } j \text{ where } 1 \leq j \leq N \text{ and } j \neq i$$

$$g_i(j)+h_i(j)=P_i \text{ otherwise.}$$

Using FSS, either $g_i$ or $h_i$ can be represented concisely, e.g., by $\log_2(N) \times \text{size\_of\_tag}$ bits and it is impossible to infer i or $P_i$ from either $g_i$ or $h_i$. To prevent brute force security attack, size_of_tag is typically 96 bits or larger. Out of the N dimensions, assume that there are n dimensions with non-zero value, where n<<N. For each of the n dimensions, the application 112 can construct two pseudo-random functions g and h as described above. Furthermore, the application 112 can package the concise representation of all n functions g into a vector G, and package the concise representation of n functions h into another vector H in the same order.

In addition, the application 112 can split the dense part of the user profile P into two additive secret shares $[P_1]$ and $[P_2]$. The application 112 can then send $[P_1]$ and G to computing system $MPC_1$ and send $[P_2]$ and H to $MPC_2$. Transmitting G requires $|G| \times \log_2(N) \times \text{size\_of\_tag} = n \times \log_2(N) \times \text{size\_of\_tag}$ bits, which may be far smaller than N bits needed if the application 112 transmits the sparse part of the user profile in a dense vector, when n<<N.

When computing system $MPC_1$ receives $g_1$ and computing system $MPC_2$ receives $h_1$, the two computing systems $MPC_1$ and $MPC_2$ can create Shamir's secret shares independently. For any j where $1 \leq j \leq N$, computing system $MPC_1$ creates a point on two-dimensional coordinate $[1, 2 \times g_i(j)]$ and computing system $MPC_2$ creates a point on two-dimensional coordinate $[-1, 2 \times h_i(j)]$. If the two computing systems $MPC_1$ and $MPC_2$ collaboratively construct a line $y=a_0+a_1 \times x$ that passes through both points, Relationships 14 and 15 are formed.

$$2 \times g_i(j)=a_0+a_1 \quad \text{Relationship 14}$$

$$2 \times h_i(j)=a_0-a_1 \quad \text{Relationship 15}$$

If the two relationships are added together, it results in $2 \times g_i(j)+2 \times h_i(j)=(a_0+a_1)+(a_0-a_1)$, which simplifies to $a_0=g_i(j)+h_i(j)$. Therefore, $[1, 2 \times g_i(j)]$ and $[-1, 2 \times h_i(j)]$ are two secret shares of the i-th non-zero element in the sparese array, i.e., $P_i$.

During the random projection operations of the machine learning training process, the computing system $MPC_1$ can independently assemble its vectors of secret shares for the user profile from both $[P_1]$ and G. Per the above description, it is known that $|G|=n$, where n is the number of non-zero elements in the sparse part of the user profile. In addition, it is known that the sparse part of the user profile is N dimension, where n<<N.

Assume that $G=\{g_1, \ldots g_n\}$. For the j-th dimension where $1 \leq j \leq N$, and $1 \leq k \leq n$, let $[SP_{j,1}]=\Sigma_{k=1}^{n} g_k(j)$. Similarly, let $H=\{h_1, \ldots h_n\}$. The computing system $MPC_2$ can independently calculate $[SP_{j,2}]=\Sigma_{k=1}^{n} h_k(j)$. It is easy to prove that $[SP_{j,1}]$ and $[SP_{j,2}]$ are secret shares of $SP_j$, i.e., the secret value of the j-th element in the original sparse part of the user profile.

Let $[SP_1]=\{[SP_{1,1}], \ldots [SP_{N,1}]\}$, i.e., the reconstructed secret share in dense representation of the sparse part of the user profile. By concatenating $[P_1]$ and $[SP_1]$, computing system $MPC_1$ can reconstruct the full secret share of the original user profile. The computing system $MPC_1$ can then randomly project $[P_1]\|[SP_1]$. Similarly, computing system $MPC_2$ can randomly project $[P_2]\|[SP_2]$. After projection, the techniques described above can be used to generate the machine learning models in a similar manner.

Figure 6:
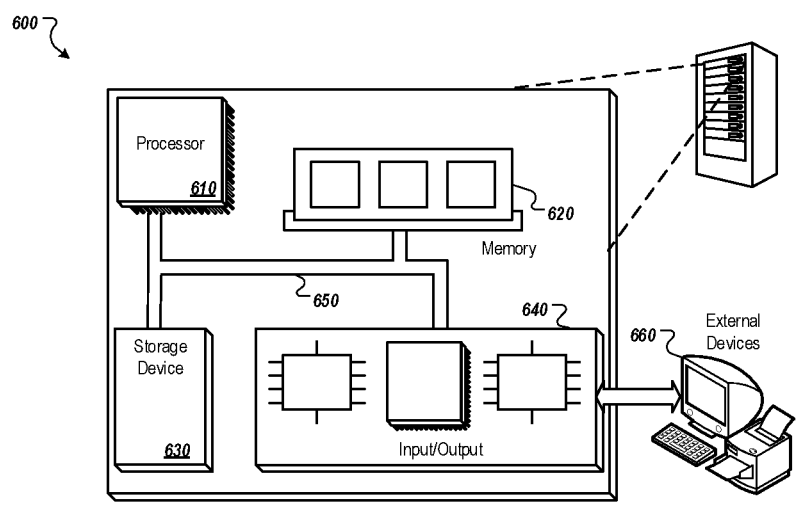
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, by a first computing system of a plurality of multi-party computation (MPC) systems, an inference request comprising a first share of a given user profile comprising data about a given user;
identifying a number k of nearest neighbor user profiles that are considered most similar to the given user profile among a plurality of user profiles, wherein k is a positive integer, and wherein each user profile comprises a respective label indicating one or more user groups to which the user profile is assigned, the identifying comprising:
    identifying, by the first computing system and based on the first share of the given user profile and a first k-nearest neighbor model trained using the plurality of user profiles, a first set of nearest neighbor user profiles;
    receiving, by the first computing system and from each of one or more second computing systems of the plurality of MPC systems, data indicating a respective second set of nearest neighbor profiles identified by the second computing system based on a respective second share of the given user profile and a respective second k-nearest neighbor model trained by the second computing system;
    identifying, by the first computing system and based on the first set of nearest neighbor user profiles and each second set of nearest neighbor user profiles, the number k of nearest neighbor user profiles;
generating, by the first computing system, a first share of an inference result based on the respective label for each of the k nearest neighbor user profiles, wherein the inference result indicates whether the given user corresponding to the given user profile is to be added to a given user group indicated by the respective label of at least one of the k nearest neighbor user profiles; and
providing, by the first computing system and to a client device, the first share of the inference result.

2. The computer-implemented method of claim 1, wherein the inference request comprises an encrypted second share of the given user profile that was encrypted using an encryption key of the second computing system, the method further comprising transmitting the encrypted second share of the given user profile to the second computing system.

3. The computer-implemented method of claim 1, further comprising providing one or more second shares of the inference result to the client device, wherein each second share of the inference result is encrypted using an encryption key of an application of the client device.

4. The computer-implemented method of claim 1, wherein:
the label for each user profile has a Boolean type for binary classification; and
generating the first share of the inference result comprises:
    determining a first share of a sum of the labels for the k nearest neighbor user profiles;
    receiving, from the second computing system, a second share of the sum of the labels for the k nearest neighbor user profiles;
    determining, based on the first share of a sum of the labels and the second share of a sum of the labels, the sum of the labels;
    determining that the sum of the labels exceeds a threshold;
    in response to determining that the sum of the labels exceeds a threshold determining, as the inference result, to add the given user to the given user group; and
    generating the first share of the inference result based on the inference result.

5. The computer-implemented method of claim 1, wherein:
the label for each user profile has a numerical value; and
generating the first share of the inference result comprises:
    determining a first share of a sum of the labels for the k nearest neighbor user profiles;
    receiving, from the second computing system, a second share of the sum of the labels for the k nearest neighbor user profiles;
    determining, based on the first share of a sum of the labels and the second share of a sum of the labels, the sum of the labels;
    determining, as the inference result, based on the sum of the labels, that the given user is to join the given user group; and
    generating the first share of the inference result based on the inference result.

6. The computer-implemented method of claim 1, wherein the label for each user profile has a categorical value; and
generating the first share of the inference result comprises, for each label in a set of labels:
determining a first share of a frequency at which user profiles in the k nearest neighbor profiles have the label;
receiving, from the second computing system, a second share of the frequency at which user profiles in the k nearest neighbor profiles have the label; and
determining, based on the first share and second share of the frequency at which user profiles in the k nearest neighbor profiles have the label, the frequency at which users profiles in the k nearest neighbor profiles have the label, the method further comprising:
identifying the label having the highest frequency;
assigning, as the inference result, the given user is to join the given user group corresponding to the label having the highest frequency; and
generating the first share of the inference result based on the inference result.

7. The computer-implemented method of claim 1, further comprising training the first k-nearest neighbor model using a secure MPC process in collaboration with the one or more second computing systems using first secret shares of a plurality of user profiles maintained by the first computing system and respective second secret shares of the plurality of user profiles maintained by one or more second computing systems.

8. The computer-implemented method of claim 1, further comprising training the first k-nearest neighbor model, the training comprising:
creating, in collaboration with the second computing system, first shares of a random bit flipping pattern;
generating a first share of a bit matrix by projecting a first share of each user profile in the plurality of user profiles onto a set of random projection planes;
modifying the first share of the bit matrix by modifying one or more bits of the first share of the bit matrix using the first shares of the bit flipping pattern;
providing a first portion of the modified first share of the bit matrix to the second computing system;
receiving, from the second computing system, a second half of a modified second share of the bit matrix generated by the second computing system using second shares of the user profiles in the plurality of user profiles and second shares of the random bit flipping pattern; and
reconstructing, by the first computing system, bit vectors for the second half of the first bit matrix using a second half of the modified first share of the bit matrix and the second half of the modified second share of the bit matrix.

9. The computer-implemented method of claim 8, wherein creating, in collaboration with the second computing system, first shares of a random bit flipping pattern comprises:
generating a first m-dimensional vector comprising a plurality of first elements that each have a value of zero or one, wherein the m-dimensional vector comprises m dimensions and m is a positive integer;
splitting the first m-dimensional vector into two shares;
providing a first share of the first m-dimensional vector to the second computing system;
receiving a first share of a second m-dimensional vector from the second computing system; and
computing, in collaboration with the second computing system, the first share of the random bit flipping pattern using shares of the first and second m-dimensional vectors.

10. The computer-implemented method of claim 1, wherein the plurality of MPC computing systems comprises more than two MPC computing systems.

11. The computer-implemented method of claim 1, wherein the client device computes the given user profile using a plurality of feature vectors that each include feature values related to events of a user of the client device and a decay rate for each feature vector.

12. The computer-implemented method of claim 1, wherein the client device computes the given user profile using a plurality of feature vectors that each include feature values related to events of a user of the client device, wherein computing the given user profile comprises:
classifying one or more of the plurality of feature vectors as sparse feature vectors; and
classifying one or more of the plurality of feature vectors as dense feature vectors, the method further comprising:
generating the first share of the given user profile and respective second shares of the given user profile for the one or more second computing systems using the sparse feature vectors and dense feature vectors, wherein generating the first share and the respective one or more second shares of the given user profile comprises splitting the sparse feature vector using a Function Secret Sharing (FSS) technique.

13. A system comprising:
one or more processors of a first computing system; and
one or more storage devices storing instructions that, when executed by the one or more processors, cause the one or more processors to perform operations comprising:
receiving, by the first computing system of a plurality of multi-party computation (MPC) systems, an inference request comprising a first share of a given user profile comprising data about a given user,
identifying a number k of nearest neighbor user profiles that are considered most similar to the given user profile among a plurality of user profiles, wherein k is a positive integer, and wherein each user profile comprises a respective label indicating one or more user groups to which the user profile is assigned, the identifying comprising:
identifying, by the first computing system and based on the first share of the given user profile and a first k-nearest neighbor model trained using the plurality of user profiles, a first set of nearest neighbor user profiles;
receiving, by the first computing system and from each of one or more second computing systems of the plurality of MPC systems, data indicating a respective second set of nearest neighbor profiles identified by the second computing system based on a respective second share of the given user profile and a respective second k-nearest neighbor model trained by the second computing system;
identifying, by the first computing system and based on the first set of nearest neighbor user profiles and each second set of nearest neighbor user profiles, the number k of nearest neighbor user profiles;

generating, by the first computing system, a first share of an inference result based on the respective label for each of the k nearest neighbor user profiles, wherein the inference result indicates whether the given user corresponding to the given user profile is to be added to a given user group indicated by the respective label of at least one of the k nearest neighbor user profiles; and providing, by the first computing system and to a client device, the first share of the inference result.

14. The system of claim 13, wherein the inference request comprises an encrypted second share of the given user profile that was encrypted using an encryption key of the second computing system, the operations further comprising transmitting the encrypted second share of the given user profile to the second computing system.

15. The system of claim 13, wherein the second share of the inference result is encrypted using an encryption key of an application of the client device.

16. The system of claim 13, wherein:
the label for each user profile has a Boolean type for binary classification; and
generating the first share of the inference result comprises:
determining a first share of a sum of the labels for the k nearest neighbor user profiles;
receiving, from the second computing system, a second share of the sum of the labels for the k nearest neighbor user profiles;
determining, based on the first share of a sum of the labels and the second share of a sum of the labels, the sum of the labels;
determining that the sum of the labels exceeds a threshold;
in response to determining that the sum of the labels exceeds a threshold determining, as the inference result, to add the given user to the given user group; and
generating the first share of the inference result based on the inference result.

17. The system of claim 13, wherein:
the label for each user profile has a numerical value; and
generating the first share of the inference result comprises:
determining a first share of a sum of the labels for the k nearest neighbor user profiles;
receiving, from the second computing system, a second share of the sum of the labels for the k nearest neighbor user profiles;
determining, based on the first share of a sum of the labels and the second share of a sum of the labels, the sum of the labels;
determining, as the inference result, based on the sum of the labels, that the given user is to join the given user group; and
generating the first share of the inference result based on the inference result.

18. The system of claim 13, wherein the label for each user profile has a categorical value; and
generating the first share of the inference result comprises, for each label in a set of labels:
determining a first share of a frequency at which user profiles in the k nearest neighbor profiles have the label;

receiving, from the second computing system, a second share of the frequency at which user profiles in the k nearest neighbor profiles have the label; and determining, based on the first share and second share of the frequency at which user profiles in the k nearest neighbor profiles have the label, the frequency at which users profiles in the k nearest neighbor profiles have the label, the operations further comprising:
identifying the label having the highest frequency;
assigning, as the inference result, the given user is to join the given user group corresponding to the label having the highest frequency; and
generating the first share of the inference result based on the inference result.

19. The system of claim 13, wherein the operations comprise training the first k-nearest neighbor model using a secure MPC process in collaboration with the one or more second computing systems using first secret shares of a plurality of user profiles maintained by the first computing system and respective second secret shares of the plurality of user profiles maintained by one or more second computing systems.

20. A non-transitory computer readable storage medium carrying instructions that, when executed by one or more processors of a first computing system, cause the one or more processors to perform operations comprising:
receiving, by the first computing system of a plurality of multi-party computation (MPC) systems, an inference request comprising a first share of a given user profile comprising data about a given user;
identifying a number k of nearest neighbor user profiles that are considered most similar to the given user profile among a plurality of user profiles, wherein k is a positive integer, and wherein each user profile comprises a respective label indicating one or more user groups to which the user profile is assigned, the identifying comprising:
identifying, by the first computing system and based on the first share of the given user profile and a first k-nearest neighbor model trained using the plurality of user profiles, a first set of nearest neighbor user profiles;
receiving, by the first computing system and from each of one or more second computing systems of the plurality of MPC systems, data indicating a respective second set of nearest neighbor profiles identified by the second computing system based on a respective second share of the given user profile and a respective second k-nearest neighbor model trained by the second computing system;
identifying, by the first computing system and based on the first set of nearest neighbor user profiles and each second set of nearest neighbor user profiles, the number k of nearest neighbor user profiles;
generating, by the first computing system, a first share of an inference result based on the respective label for each of the k nearest neighbor user profiles, wherein the inference result indicates whether the given user corresponding to the given user profile is to be added to a given user group indicated by the respective label of at least one of the k nearest neighbor user profiles; and
providing, by the first computing system and to a client device, the first share of the inference result.

* * * * *